US009456396B2

(12) United States Patent
Liu et al.

(10) Patent No.: US 9,456,396 B2
(45) Date of Patent: Sep. 27, 2016

(54) TERMINAL ACCESS METHOD AND SYSTEM, AND TERMINAL

(71) Applicant: ZTE CORPORATION, Shenzhen, Guangdong Province (CN)

(72) Inventors: Xuebin Liu, Shenzhen (CN); Hui Dong, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/418,193

(22) PCT Filed: Aug. 6, 2013

(86) PCT No.: PCT/CN2013/080912
§ 371 (c)(1),
(2) Date: Jan. 29, 2015

(87) PCT Pub. No.: WO2014/032502
PCT Pub. Date: Mar. 6, 2014

(65) Prior Publication Data
US 2015/0289179 A1    Oct. 8, 2015

(30) Foreign Application Priority Data
Aug. 28, 2012 (CN) .......................... 2012 1 0309478

(51) Int. Cl.
*H04W 36/14* (2009.01)
*H04W 48/20* (2009.01)
(Continued)

(52) U.S. Cl.
CPC ............. *H04W 36/14* (2013.01); *H04W 48/16* (2013.01); *H04W 48/20* (2013.01); *H04W 74/002* (2013.01); *H04W 8/18* (2013.01); *H04W 36/30* (2013.01)

(58) Field of Classification Search
None
See application file for complete search history.

(56) References Cited

U.S. PATENT DOCUMENTS 7,639,649 B2 * 12/2009 Czaja .................... H04W 36/14
370/332
2005/0190733 A1    9/2005 Ishidoshiro
(Continued)

FOREIGN PATENT DOCUMENTS

CN    101175298 A    5/2008
CN    101370251 A    2/2009
(Continued)

*Primary Examiner* — Bunjob Jaroenchonwanit
(74) *Attorney, Agent, or Firm* — Ling Wu; Stephen Yang; Ling and Yang Intellectual Property

(57) ABSTRACT

The present document provides a terminal access method, system and a terminal. The method includes: a terminal downloading from an Internet server and storing a network cloud chart containing cell related information which includes a terminal common air interface configuration parameter of a cell, wherein the terminal common air interface configuration parameter and/or a cell broadcast message includes a first uplink pilot frequency for intelligent access; performing a random access procedure, wherein the first uplink pilot frequency is sent if the network cloud chart stored by the terminal includes the cell related information of the cell to be accessed and the cell related information is valid, otherwise a second uplink pilot frequency for non-intelligent access is sent; and performing a parameter configuration procedure, wherein terminal common air interface configuration corresponding to the terminal common air interface configuration parameter is not performed if the terminal sends the first uplink pilot frequency.

20 Claims, 10 Drawing Sheets

(51) Int. Cl.
    *H04W 48/16*     (2009.01)
    *H04W 74/00*     (2009.01)
    *H04W 8/18*     (2009.01)
    *H04W 36/30*     (2009.01)

(56) References Cited

U.S. PATENT DOCUMENTS

| | | | |
|---|---|---|---|
| 2007/0026860 A1* | 2/2007 | Okamoto | H04W 36/0083 455/436 |
| 2008/0049702 A1 | 2/2008 | Meylan et al. | |
| 2009/0252081 A1* | 10/2009 | Kang | H04W 72/1263 370/315 |
| 2010/0322115 A1 | 12/2010 | Wei et al. | |
| 2011/0105184 A1* | 5/2011 | Piirainen | H04W 24/02 455/562.1 |
| 2011/0230179 A1 | 9/2011 | Lee et al. | |
| 2015/0189645 A1* | 7/2015 | Maeda | H04W 72/0413 370/336 |
| 2015/0201326 A1* | 7/2015 | Kazmi | H04W 28/18 370/329 |
| 2015/0223219 A1* | 8/2015 | Nagata | H04W 48/16 455/449 |
| 2015/0280875 A1* | 10/2015 | Jing | H04L 5/0023 370/329 |
| 2015/0365966 A1* | 12/2015 | Wang | H04L 5/0048 370/329 |

FOREIGN PATENT DOCUMENTS

| | | |
|---|---|---|
| CN | 102572978 A | 7/2012 |
| EP | 2117274 A1 | 11/2009 |
| GB | 2396526 A | 6/2004 |
| JP | 2006332863 A | 12/2006 |
| JP | 2009535968 A | 10/2009 |
| JP | 2010518725 A | 5/2010 |

\* cited by examiner

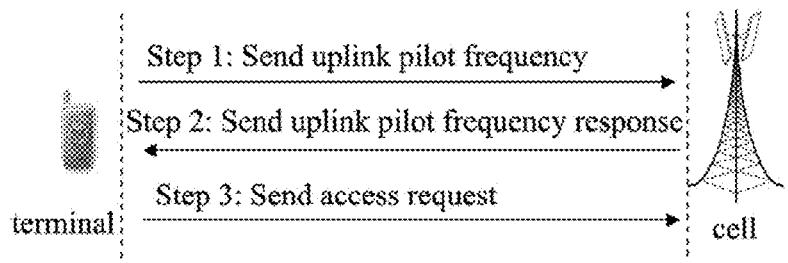
FIG. 11
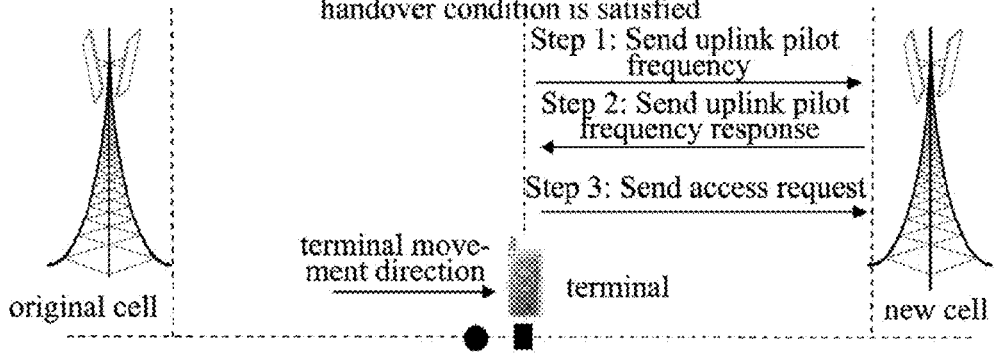
FIG. 12
FIG. 13

TERMINAL ACCESS METHOD AND SYSTEM, AND TERMINAL

TECHNICAL FIELD

The present document relates to a mobile communication system, and in particular, to a terminal access method, system and a terminal.

BACKGROUND OF THE RELATED ART

Mobile communication systems use cellular networking cell system. Frequency reuse-based cellular networking cell system improves system capacity and implements broad network coverage in a real sense. A terminal establishes a connection with a network cell through an access procedure and obtains communication services. When the terminal moves and spans the cell, a handover procedure is required to switch communication services between the terminal and the original cell to a new cell, ensuring uninterrupted communication. As shown in FIGS. 1 and 2, schematic diagrams of the traditional wireless air interface access procedure and wireless air interface handover procedure used still in the third generation mobile communication system (3G) and the fourth generation mobile communication system (4G) presently are provided. Step 1 to step 3 in FIG. 1 and step 3 to step 5 are a type of random access. In 4G, there are 5 scenes (A, B, C, D and E) for the random access, which represent reasons for 5 accesses:

A. Initial access initiated from RRC_IDLE (Radio Resource Control_IDLE)
B. Initial access initiated after failure of wireless links
C. Random access during handover
D. Downlink data arrival under RRC_CONNECTED (Radio Resource Control_CONNECTED)
E. Uplink data arrival under RRC_CONNECTED The 5 scenes described above can be distinguished by signaling contents of step 3 in FIG. 1 or step 5 in FIG. 2.

In order to further improve spectrum utilization, starting from 3G, mobile communication systems tend to use the whole network cellular cell co-channel networking, in which all cells use same frequency resources. However, even so, co-channel interference occurs between adjacent cells, and the co-channel interference is the most serious in edge areas at the boundary of the adjacent cells, i.e., handover areas. The cell edge, which is supposed to be a weak signal field where path loss may be large, coupled with the co-channel interference between the adjacent cells, makes wireless channel condition worse and signal interference noise ratio (SINR) lower. According to the basic principle and procedure of handover, a terminal usually sends measurement reports to the original cell only when the terminal has already arrived at the coverage area of the new cell and signals in the new cell have already been stronger than those in the original cell. Then the terminal waits for a handover command from the original cell and hands over to the new cell after receiving the handover command, see FIG. 2. In this handover process, step 1 and step 2 are actually the stages when the co-channel interference is most serious and communication channel quality is worst.

Because, in principle, all channel resources are based on shared scheduling, service type of 4G is more simplified than 3G. There is only one service, packet service (PS), in 4G, therefore, wireless air interface signaling of 4G is much more simplified than that of 3G. Whether the procedure is an access procedure or a handover procedure, it can be classified as configuration of RRC connection, including establishment, reestablishment and reconfiguration of RRC connection. For the five random accesses described above, the random accesses in the three scenes A, D and E correspond to "RRC connection establishment request", the random access in the scene B corresponds to "RRC connection reestablishment request", and the random access in the scene C corresponds to "RRC connection reconfiguration completion". In addition, since a 4G terminal can detect adjacent cells itself, unlike 3G, a 4G cell does not need to send information of the adjacent cells to the terminals.

Although 4G signaling is much simpler than 3G signaling, for cellular cell networks in dense urban, mixed signals result in frequent signaling interaction between terminals and cells, which brings a lot of signaling overheads and co-channel interferences to 4G networks. Moreover, characteristics such as online forever and burstness of 4G data services also increase signaling interaction between terminals and cells easily, resulting in what is commonly known as "signal storm" in the industry.

At present, co-channel interference, signaling overhead, resource energy loss and service performance (e.g., uplink throughput and downlink throughput) in handover areas at the cellular cell edge under co-channel networking, which have become acknowledged shortcomings in 3G and 4G co-channel networking, are the focus of common concern of technical research, standard evolution and industry development.

SUMMARY

Embodiments of the present document provide a terminal access method, system and a terminal, so as to solve the problem of large signaling overhead.

One embodiment of the present document provides a terminal access method, comprising:

a terminal downloading from an Internet server and storing a network cloud chart containing cell related information, wherein the cell related information includes a terminal common air interface configuration parameter of the cell, and the terminal common air interface configuration parameter of the network cloud chart and/or a cell broadcast message includes a first uplink pilot frequency for intelligent access;

performing a random access procedure, wherein the first uplink pilot frequency is sent if the network cloud chart stored by the terminal includes the cell related information of the cell to be accessed and the cell related information is valid, and a second uplink pilot frequency for non-intelligent access is sent if the network cloud chart stored by the terminal does not include the cell related information of the cell to be accessed or the cell related information is invalid; and performing a parameter configuration procedure, wherein terminal common air interface configuration corresponding to the terminal common air interface configuration parameter in the network cloud chart is not performed if the terminal sends the first uplink pilot frequency, and the terminal common air interface configuration corresponding to the terminal common air interface configuration parameter in the network cloud chart is performed if the terminal sends the second uplink pilot frequency.

One embodiment of the present document provides a terminal access system, comprising:

an Internet server, configured to store a network cloud chart containing cell related information, wherein the cell related information includes a terminal common air interface configuration parameter of a cell, and the terminal common air interface configuration parameter of the network cloud chart and/or a cell broadcast message includes a first uplink pilot frequency for intelligent access;

a network cloud chart downloading module of the terminal, configured to download from the Internet server and store the network cloud chart containing the cell related information, a random access module of the terminal, configured to interact with the cell and perform a random access procedure, wherein the first uplink pilot frequency is sent if the network cloud chart stored by the terminal includes the cell related information of the cell to be accessed and the cell related information is valid, and a second uplink pilot frequency for non-intelligent access is sent if the network cloud chart stored by the terminal does not include the cell related information of the cell to be accessed or the cell related information is invalid; and parameter configuration modules of the terminal, the cell and a core network, configured to perform a wireless air interface parameter configuration procedure, wherein terminal common air interface configuration corresponding to the terminal common air interface configuration parameter in the network cloud chart is not performed if the terminal sends the first uplink pilot frequency, and the terminal common air interface configuration corresponding to the terminal common air interface configuration parameter in the network cloud chart is performed if the terminal sends the second uplink pilot frequency.

One embodiment of the present document further provides another terminal access method, comprising:

a core network storing a terminal information shared cloud chart, wherein the terminal information shared cloud chart contains related information of a terminal which is attached or has ever been attached to the network;

a cell searching for whether the terminal information shared cloud chart of the core network contains the related information of the terminal after receiving an access request sent by the terminal;

performing a parameter configuration procedure, wherein security parameter configuration is not performed if the terminal information shared cloud chart contains the related information of the terminal, and the security parameter configuration is performed if the terminal information shared cloud chart does not contain the related information of the terminal; and the cell updating the terminal information shared cloud chart stored by the core network when the information is changed.

In order to solve the technical problem, the present document further provides another terminal access system, comprising:

a shared cloud chart storing module of a core network, configured to store a terminal information shared cloud chart containing related information of a terminal which is attached or has ever been attached to the network and update the terminal information shared cloud chart according to a terminal information update message;

a terminal recognition module of a cell, configured to search for whether the terminal information shared cloud chart of the core network contains the related information of the terminal after receiving an access request sent by the terminal;

parameter configuration modules of the core network, the cell and the terminal, configured to perform a parameter configuration procedure, wherein security parameter configuration is not performed if the terminal information shared cloud chart contains the related information of the terminal and the security parameter configuration is performed if the terminal information shared cloud chart does not contain the related information of the terminal; and a shared cloud chart updating module of the cell, configured to send the terminal information update message to the core network when the information of the terminal is changed.

One embodiment of the present document further provides an optimal terminal access method, wherein a terminal downloads from an Internet server a network cloud chart containing cell related information, the cell related information includes a terminal common air interface configuration parameter of a cell, and a core network stores a terminal information shared cloud chart containing related information of a terminal which is attached or has ever been attached to the network, the method comprises:

a cell selecting step, wherein the terminal selects a cell to be accessed according to measurement results;

a random access step, wherein it is to perform a random access procedure, and it is to perform a terminal recognition step subsequent to the random access procedure if the network cloud chart downloaded by the terminal satisfies an intelligent access condition and it is to perform the terminal recognition step or a parameter configuration step subsequent to the random access procedure if the network cloud chart downloaded by the terminal does not satisfy the intelligent access condition;

the terminal recognition step, wherein the cell searched for whether the terminal information shared cloud chart of the core network contains the related information of the terminal, the terminal information shared cloud chart contains the information of the terminal which is attached or has ever been attached to the network;

the parameter configuration step, wherein it is to perform a parameter configuration procedure, wherein a security parameter configuration procedure is not performed if the cloud chart contains the related information of the terminal and wireless air interface common parameter configuration corresponding to the terminal common air interface configuration parameter in the network cloud chart is not performed if the intelligent access condition is satisfied; and a cloud chart updating step, wherein the terminal updates the network cloud chart stored by itself when the information is changed, and the cell updates the terminal information shard cloud chart stored by the core network.

One embodiment of the present document provides a terminal, comprising:

a network cloud chart downloading module, configured to download from an Internet server and store a network cloud chart containing cell related information, wherein the cell related information includes a terminal common air interface configuration parameter of a cell, the terminal common air interface configuration parameter of the network cloud chart and/or a cell broadcast message includes a first uplink pilot frequency for intelligent access;

an random access module, configured to interact with the cell and perform a random access procedure, wherein the first uplink pilot frequency is sent if the network cloud chart stored by the network cloud chart downloading module includes the cell related information of the cell to be accessed and the cell related information is valid, and a second uplink pilot frequency for non-intelligent access is sent if the network cloud chart stored by the network cloud chart downloading module does not include the cell related information of the cell to be accessed or the cell related information is invalid; and a parameter configuration module, configured to perform a wireless air interface parameter configuration procedure, wherein terminal common air interface configuration corresponding to the terminal common air interface configuration parameter in the network cloud chart is not performed if the first uplink pilot frequency is sent, and the terminal common air interface configuration corresponding to the terminal common air interface configuration parameter in the network cloud chart is performed if the second uplink pilot frequency is sent.

Embodiments of the present document further provide a terminal access method and terminal, so as to solve the problem of serious co-channel interference in a handover procedure.

A terminal access method provided by one embodiment of the present document comprises:

a cell selecting step, wherein if the terminal determines that it is needed to hand over to a new cell according to measurement results, the terminal selects a new cell to be accessed;

an uplink pilot frequency sending step, wherein the terminal sends an uplink pilot frequency; and an access request sending step, wherein the terminal sends an access request after receiving an uplink pilot frequency response sent by a network side, wherein an initiating access reason contained in the access request is an initial access initiated after failure of wireless links.

One embodiment of the present document further provides a terminal, comprising:

a cell selecting module, configured to select a new cell to be accessed after determining to hand over to the new cell according to measurement results;

an uplink pilot frequency sending module, configured to send an uplink pilot frequency; and an access request sending module, configured to send an access request after receiving an uplink pilot frequency response sent by a network side, wherein an initiating access reason contained in the access request is an initial access initiated after failure of wireless links.

In the terminal access methods of the embodiments of the present document, an Internet server or core network is used to pre-store configuration parameters to be implemented using signaling interaction during an access procedure, so as to prevent effectively a terminal from performing too much signaling interaction and reduce signaling overheads. For handover scenes, the embodiment of the present document can avoid a serious interference stage during the interaction with the original cell by directly selecting a cell to be handed over to and directed initiating an access procedure to a target cell.

BRIEF DESCRIPTION OF DRAWINGS

FIGS. 11 and 12 are flow charts of random access procedures of a terminal supporting intelligent access which are the most simplified in an access scene and a handover scene in accordance with an embodiment of the present document;

FIG. 13 is a schematic diagram of the terminal recognition step in FIG. 7;

PREFERRED EMBODIMENTS OF THE INVENTION

Embodiments of the present document will be described in detail in conjunction with the accompanying drawings. It is should be noted that the embodiments in this application and features in the embodiments can combined arbitrarily with each other without conflict.

In an embodiment of the present document, an Internet server stores a network cloud chart containing cell related information. The cell related information includes a terminal common air interface configuration parameter of the cell. When a terminal will access to a certain cell according to its stored network clout chart and has stored the valid cell related information, a common parameter configuration procedure in an access process may be omitted, simplifying the access process.

The First Embodiment

Figure 3:
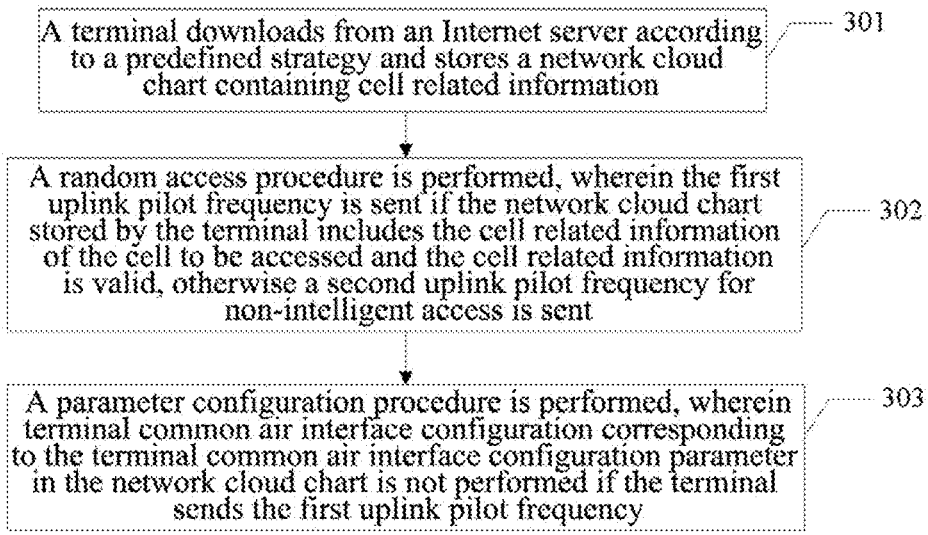
FIG. 3 is a flow chart of a terminal access method in accordance with the first embodiment of the present document.

In a terminal access method in accordance with the first embodiment of the present document, a terminal downloads a network cloud chart from an Internet server. Preferably, the terminal downloads the network cloud chart from the Internet server only according to a predefined strategy, such as period or event triggering, and may download related information of some cell or cells according to its position to update its own network cloud chart, alternatively, the network cloud chart in the Internet server is divided into several sub-network cloud charts corresponding to different areas, the terminal may download the corresponding sub-network cloud charts according to its position to update its own network cloud chart. As shown in FIG. 3, the method in accordance with the first embodiment comprises:

In step 301, a terminal downloads from an Internet server and stores a network cloud chart containing cell related information, the cell related information includes a terminal common air interface configuration parameter of the cell, and the terminal common air interface configuration parameter of the network cloud chart and/or a cell broadcast message includes a first uplink pilot frequency for intelligent access;

In step 302, a random access procedure is performed, wherein the first uplink pilot frequency is sent if the network cloud chart stored by the terminal includes the cell related information of the cell to be accessed and the cell related information is valid, and a second uplink pilot frequency for non-intelligent access is sent if the network cloud chart stored by the terminal does not include the cell related information of the cell to be accessed or the cell related information is invalid.

In the embodiment of the present document, the cell to be accessed by the terminal is selected according to measurement results.

Preferably, the validity of the cell related information stored by the terminal can be determined in the following manner:

The network cloud chart further includes a information update time corresponding to the cell related information, the cell related information further contains cell identification information for identifying the cell. The cell broadcast message carries the information update time of the cell related information in the network cloud chart. Before the random access procedure is performed, the method further comprises:

the terminal receiving the cell broadcast message and determining whether the cell related information of the cell to be accessed has been stored according to the cell identification information; if it has been stored, determining whether the information update time in the cell broadcast message is consistent with the information update time of the cell related information stored by the terminal, and if consistent, determining the cell related information is valid and if inconsistent, determining it is invalid.

In Step 303, a parameter configuration procedure is performed, wherein terminal common air interface configuration corresponding to the terminal common air interface configuration parameter in the network cloud chart is not performed if the terminal sends the first uplink pilot frequency, and the terminal common air interface configuration corresponding to the terminal common air interface configuration parameter in the network cloud chart is performed if the terminal sends the second uplink pilot frequency.

In addition to the terminal common air interface configuration, the parameter configuration procedure further includes terminal dedicated parameter configuration, security parameter configuration (including but not limited to authentication, safe mode, integrity protection, and encryption and decryption algorithm) between a core network and the terminal, and parameter configuration (including but not limited to: the cell to be accessed obtains and inherits the original bearing configuration of the terminal through the core network; if the cell to be accessed is different from a cell to which the terminal currently belongs in a terminal information shared cloud chart, i.e., the cell to be accessed is a new cell, then the cell to be accessed will further transfer data transmission relationship of the terminal from the original cell through the core network) between the cell and the core network.

In the first embodiment, the terminal common air interface configuration parameter of the cell is stored in the network cloud chart, so as to avoid a delay due to execution of the corresponding terminal common air interface configuration parameter after the access of the terminal. Most preferably, all terminal common air interface configuration parameters, i.e., a terminal common air interface configuration parameter (which is referred to as the first air interface configuration parameter in the present document) carried in the existing cell broadcast message and other terminal common air interface configuration parameters (which are referred to as the second air interface configuration parameters in the present document, for the sake of distinguishment) acquired after the terminal interacts with the cell in the existing procedure are stored in the network cloud chart. After it is determined that the network cloud chart stored by the terminal includes the cell related information of the cell to be accessed and the cell related information is valid (which can be regarded as intelligent access condition being satisfied hereinafter), the terminal may not read the second air interface configuration parameter in the cell broadcast message any more to reduce delay as much as possible.

Preferably, only the second air interface configuration parameter is stored in the network cloud chart and the first air interface configuration parameter is still carried in the existing cell broadcast message. After it is determined that the network cloud chart stored by the terminal includes the cell related information of the cell to be accessed and the cell related information is valid, the terminal reads the first air interface configuration parameter in the cell broadcast message to complete the corresponding parameter configuration, but does not need to perform the parameter configuration procedure corresponding to the second air interface configuration parameter.

It may be understood that all terminal common configuration parameters of the cell can be divided between the cell broadcast message and the network cloud chart in other manners. No matter how they are divided, after it is determined that the network cloud chart stored by the terminal includes the cell related information of the cell to be accessed and the cell related information is valid, the terminal does not need to perform the parameter configuration procedures corresponding to the terminal common air interface configuration parameters stored in the network cloud chart any more.

The Second Embodiment

Figure 4:
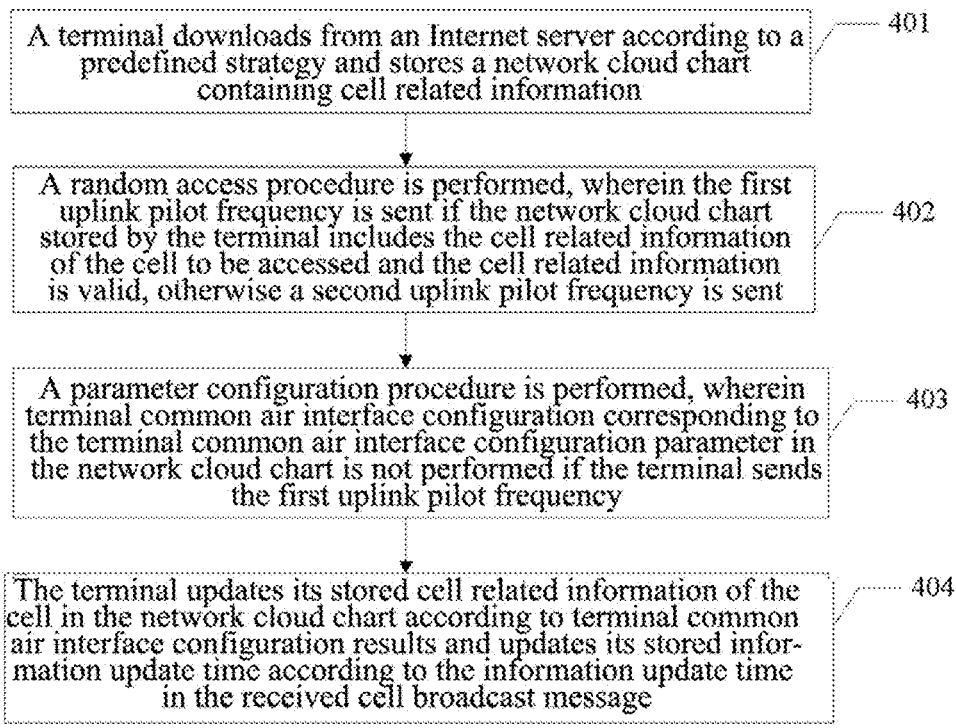
FIG. 4 is a flow chart of a terminal access method in accordance with the second embodiment of the present document.

In a terminal access method in accordance with the second embodiment of the present document, a terminal downloads a network cloud chart from an Internet server according to a predefined strategy and updates its network cloud chart in conjunction with common air interface configuration and a cell broadcast message. As shown in FIG. 4, the method in accordance with the second embodiment comprises:

In step 401, a terminal downloads from an Internet server according to a predefined strategy and storing a network cloud chart containing cell related information, the cell related information includes a terminal common air interface configuration parameter of a cell, and the terminal common air interface configuration parameter of the network cloud chart and/or a cell broadcast message includes a first uplink pilot frequency for intelligent access; and In step 402, a random access procedure is performed, wherein if the network cloud chart stored by the terminal includes the cell related information of the cell to be accessed and the cell related information is valid, then the first uplink pilot frequency is sent, otherwise a second uplink pilot frequency for non-intelligent access is sent.

Preferably, the validity of the cell related information stored by the terminal can be determined in the following manner:

The network cloud chart further includes an information update time corresponding to the cell related information, the cell related information further contains cell identification information for identifying the cell. The cell broadcast message carries the information update time of the cell related information in the network cloud chart. Before the random access procedure is performed, the method further comprises:

the terminal receiving the cell broadcast message and determining whether the cell related information of the cell to be accessed has been stored according to the cell identification information; if it has been stored, determining whether the information update time in the cell broadcast message is consistent with the information update time of the cell related information stored by the terminal, and if consistent, determining the cell related information is valid, and if inconsistent, determining it is invalid.

In Step 403, a parameter configuration procedure is performed, wherein terminal common air interface configuration corresponding to the terminal common air interface configuration parameter in the network cloud chart is not performed if the terminal sends the first uplink pilot frequency, and the terminal common air interface configuration corresponding to the terminal common air interface configuration parameter in the network cloud chart is performed if the terminal sends the second uplink pilot frequency.

In step 404, the terminal updates its stored cell related information of the cell in the network cloud chart according to terminal common air interface configuration results and updates its stored information update time according to the information update time in the received cell broadcast message.

Compared with the first embodiment, in the second embodiment, after the common air interface configuration is performed, the terminal updates its stored network cloud chart in time. In the case that the terminal interrupts communication with the cell and fails to connect to the Internet server in time to update the network cloud chart according to the predefined strategy, the process in which the common air interface configuration is required to be performed upon access again can be avoided effectively.

In order to shorten a signaling configuration procedure, an embodiment of the present document further provides another idea, that is to say, a core network stores a terminal information shared cloud chart containing related information of a terminal which is attached or has ever been attached to the network; a cell determines whether the accessing terminal satisfies the exemption condition according the terminal information shared cloud chart stored by the core network; if the terminal satisfies the condition, a security configuration procedure may not be performed, thereby shortening the access process. This will be explained by taking the third embodiment as an example.

The Third Embodiment

Figure 5:
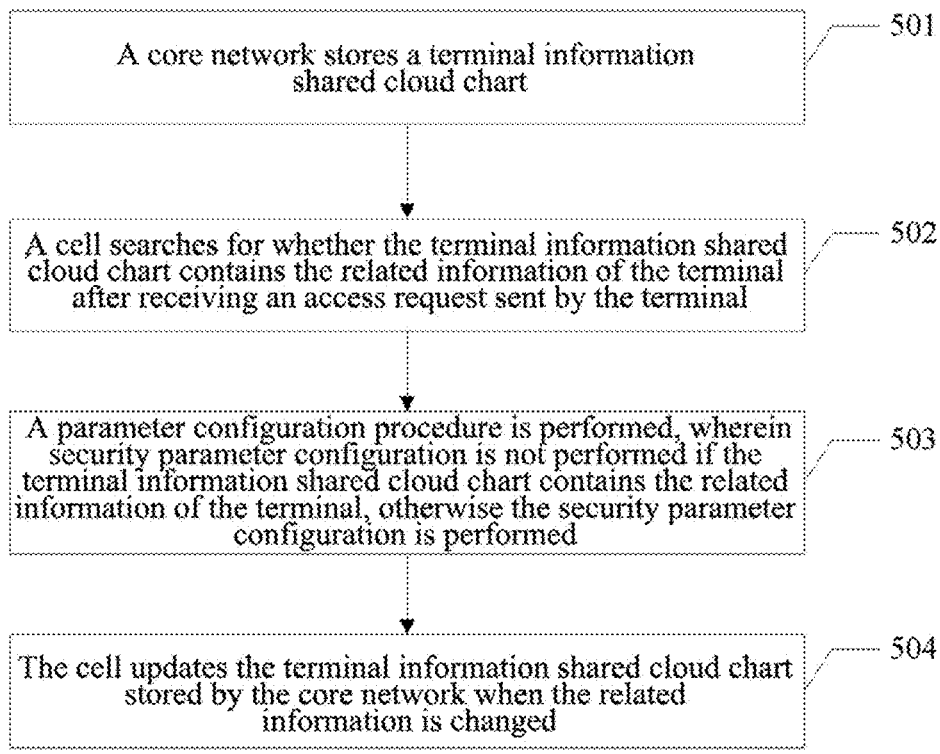
FIG. 5 is a flow chart of a terminal access method in accordance with the third embodiment of the present document.

In a terminal access method in accordance with the third embodiment of the present document, a core network stores a terminal information shared cloud chart containing related information of a terminal which is attached or has ever been attached to the network. During a parameter configuration procedure, if a cell determines that the terminal information shared cloud chart contains the related information of the terminal, then a security parameter configuration procedure will not be performed; if the cell determines that the terminal information shared cloud chart does not contain the related information of the terminal, then the security parameter configuration procedure will be performed. Specifically, as shown in FIG. 5, the method in accordance with the third embodiment comprises:

In step 501, a core network stores a terminal information shared cloud chart containing related information of a terminal which is attached or has ever been attached to the network;

In step 502, a cell searches for whether the terminal information shared cloud chart of the core network contains the related information of the terminal after receiving an access request sent by the terminal.

For the accessing terminal, the cell searches for a terminal network indicator matching with MSG3 sent by the accessing terminal through the terminal information shared cloud chart of the core network. If the terminal network indicator is found before a searching timer expires, then it can be determined preliminarily that this terminal is a legal network user and should be admitted. Then, the cell to which this terminal currently belongs, i.e., the original cell, is found in the terminal information shared cloud chart based on the geographical location proximity principle. If the original cell is found to be consistent with a new one, then it is shown that this terminal has not changed cell and will still access in the original cell. If the original cell is found to be inconsistent with a new one, then it is shown that this terminal has changes the cell or hands over from the original cell to the now cell or sends a RRC connection reestablishment request to the new cell after failure of wireless links or sends an RRC connection establishment request after de-attaching from the original cell. Therefore, the new cell is required to negotiate with the original cell through the core network, inherit bearing configuration information of the terminal in the original cell and complete the transfer of data transmission relationship of the terminal.

In step 503, a parameter configuration procedure is performed, wherein security parameter configuration is not performed if the terminal information shared cloud chart contains the related information of the terminal, and the security parameter configuration is performed if the terminal information shared cloud chart does not contain the related information of the terminal.

If there are some dedicated configurations associated with the terminal individual, such as physical uplink control channel (PUCCH) of 4G, the corresponding CQI/PMI/RI/ACK/NACK configuration and sounding reference signal (SRS) configuration, which cannot be obtained by inheriting the previous configurations or by default rules, then the cell will need to perform signaling configuration one more time for the accessing terminal after MSG3. However, this signaling overhead is much less than the signaling overhead which is traditionally required to be all configured. For semi-packet service (SPS), new addition, modification and release of dedicated bearing of services with specific quality of service (QOS) requirements as well as transfer mode (TM) switching of physical downlink shared channel (PDSCH) of the terminal will also need the cell to which the terminal belongs to send signaling for configuration.

In step 504, the cell updates the terminal information shared cloud chart stored by the core network when the information is changed.

Preferably, after the parameter configuration procedure, if there are changes in the related information of the terminal, the cell sends a terminal information update message to the core network; and the core network updates the terminal information shared cloud chart according to the terminal information update message.

Updating of the terminal information shared cloud chart includes establishment and modification of the related information of the terminal. Specifically, after the terminal has accessed to the cell successfully, the cell will search for the related information of this terminal in the terminal information shared cloud chart of the core network. If it is found, then the related information will be updated; and if it is not found, then the terminal and its related information will be established.

Changes in the related information of the terminal include the following situations:

When the cell determines that the communication with the terminal is disconnected, it sends a deactivation message to the terminal information shared chart of the core network;

The terminal information shared chart starts a timer. If the timer expires and the terminal information update message has not been received, then the terminal information shared cloud chart will delete the related information of the deactivated terminal.

The Fourth Embodiment

Figure 6:
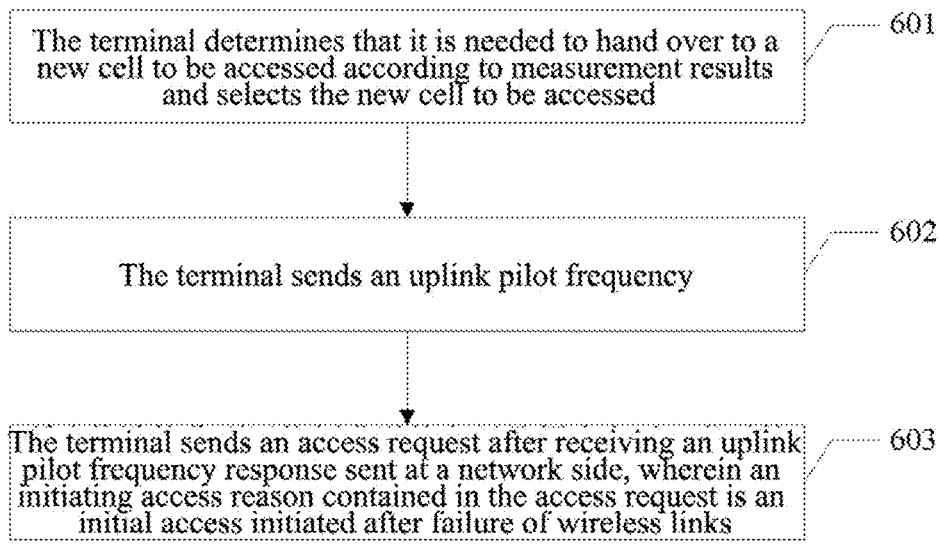
FIG. 6 is a flow chart of a terminal access method in accordance with the fourth embodiment of the present document.

One embodiment of the present document further provides a terminal access method, which mainly improves the existing cell handover procedure. As shown in FIG. 6, the method comprises:

step 601: it is a cell selecting step, the terminal determines that it is needed to hand over to a new cell according to measurement results and selects the new cell to be accessed;

step 602: it is an uplink pilot frequency sending step, the terminal sends an uplink pilot frequency; and step 603: it is an access request sending step, the terminal sends an access request after receiving an uplink pilot frequency response sent at a network side, wherein an initiating access reason contained in the access request is an initial access initiated after failure of wireless links.

In the existing handover technology, a terminal sends measurement reports to the original cell only when the terminal has already arrived at the coverage area of the new cell, i.e., the signal strength in the new cell is better than that in the original cell, and then the original cell sends a handover command to the terminal. During this process, the terminal always communicates with weaker cells, thus, it will always be interfered by stronger signals in the new cell. Compared with the existing technology, the terminal interacts with the new cell to be accessed directly according to measurement results in the handover scene, avoiding stages when channel condition in the traditional handover procedure is worst and lowering the risk of interruption of communication due to failure of handover. In addition, an access request carries an access reason of an initial access initiated after failure of wireless links. After receiving the access request, the cell implements smooth connection with the existing access procedure.

Additionally, methods in accordance with the embodiments of the present document are compatible with intra-cell access and inter-cell handover, integrating the intra-cell access with inter-cell handover, simplifying the signaling.

Preferably, if the terminal sends the first pilot frequency, then the access reason carried in the access request includes an initial access (corresponding to scene A in the background art), an initial access initiated after failure of wireless links (corresponding to scene B in the background art), a random access during handover (corresponding to scene C in the background art), downlink data arrival in a connected state (corresponding to scene D in the background art) and uplink data arrival in a connected state (corresponding to scene E in the background art). A specific message of the access request is the same as that in prior art, that is to say, in the scenes A, D and E, the access request is an RRC connection establishment request; in the scene B, the access request is an RRC connection reestablishment request; and the scene C, the access request is RRC connection reconfiguration completion. If the terminal sends the second uplink pilot frequency, then the access reason carried in the access request includes A, B, C and D. It should be noted that the carried access reason is modified as an initial access initiated after failure of wireless links when the terminal hands over to a new cell, i.e., the access reason is as follows: in the scenes A, D and E, the access request is the RRC connection establishment request; and in the scenes B and C, the access request is the RRC connection reestablishment request.

Optionally, the cell broadcast message further carries cell running state information. If the cell running state information indicates the current cell is in a congestion state, then the terminal reselects a cell to be accessed to perform the random access procedure.

The Fifth Embodiment

Preferably, both the network cloud chart and the terminal information shared cloud chart are used in the terminal access method to simplify the parameter configuration procedure.

Figure 7:
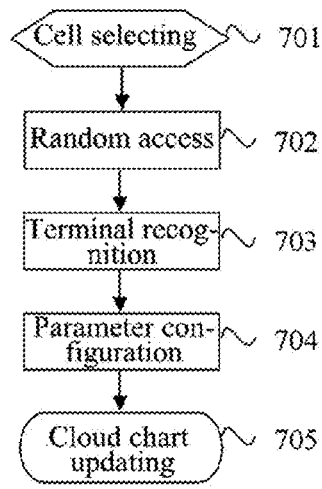
FIG. 7 is a flow chart of a terminal access method in accordance with the fifth embodiment of the present document.

In the fifth embodiment, an Internet server stores a network cloud chart containing cell related information. The cell related information includes a terminal common air interface configuration parameter of the cell. A terminal downloads the network cloud chart containing cell related information from the Internet server according to a predefined strategy. A core network stores a terminal information shared cloud chart containing related information of the terminal which is attached or has ever been attached to the network. As shown in FIG. 7, the method comprises:

step 701: it is a cell selecting step, a terminal selects a cell to be accessed according to measurement results.

Figure 8:
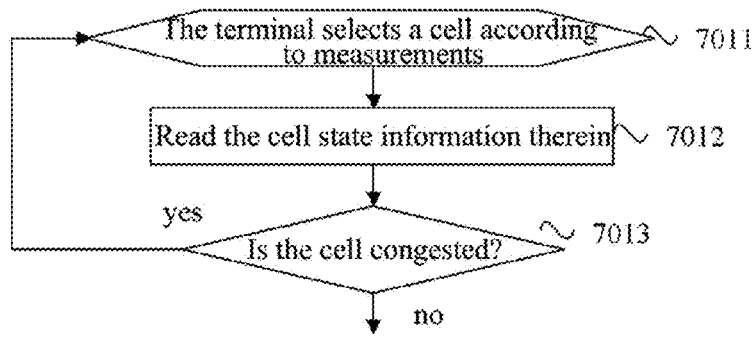
FIG. 8 is a flow diagram of the cell selecting step in FIG. 7.

As shown in FIG. 8, the cell selecting step comprises:

In step 7011, the terminal selects a cell according to measurements;

In step 7012, a cell broadcast message is received and cell state information therein is read; and In step 7013, it is to determine whether the cell is congested, if yes, step 7011 is performed and if not, step 702, i.e., the random access step, is performed.

The method further comprises:

step 702: it is a random access step, a random access procedure is performed, a terminal recognition step is performed subsequent to the random access procedure if the network cloud chart downloaded by the terminal satisfies an intelligent access condition, and the terminal recognition step or a parameter configuration step is performed subsequent to the random access procedure if the network cloud chart downloaded by the terminal does not satisfy the intelligent access condition.

Figure 9:
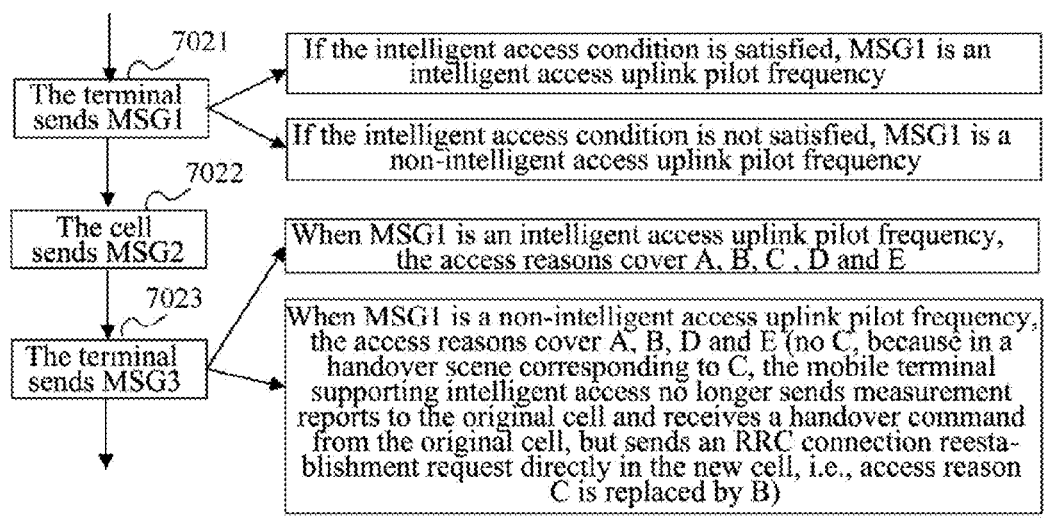
FIG. 9 is a flow diagram of the random access step in FIG. 7.

As show in FIG. 9, the random access step comprises:

In step 7021, the terminal sends an uplink pilot frequency MSG1.

In this step, if the intelligent access condition is satisfied, then an intelligent access uplink pilot frequency (also referred to as the first uplink pilot frequency) is sent during the random access procedure; and if the intelligent access condition is not satisfied, then a non-intelligent access uplink pilot frequency (also referred to as the second uplink pilot frequency) is sent.

Figure 10:
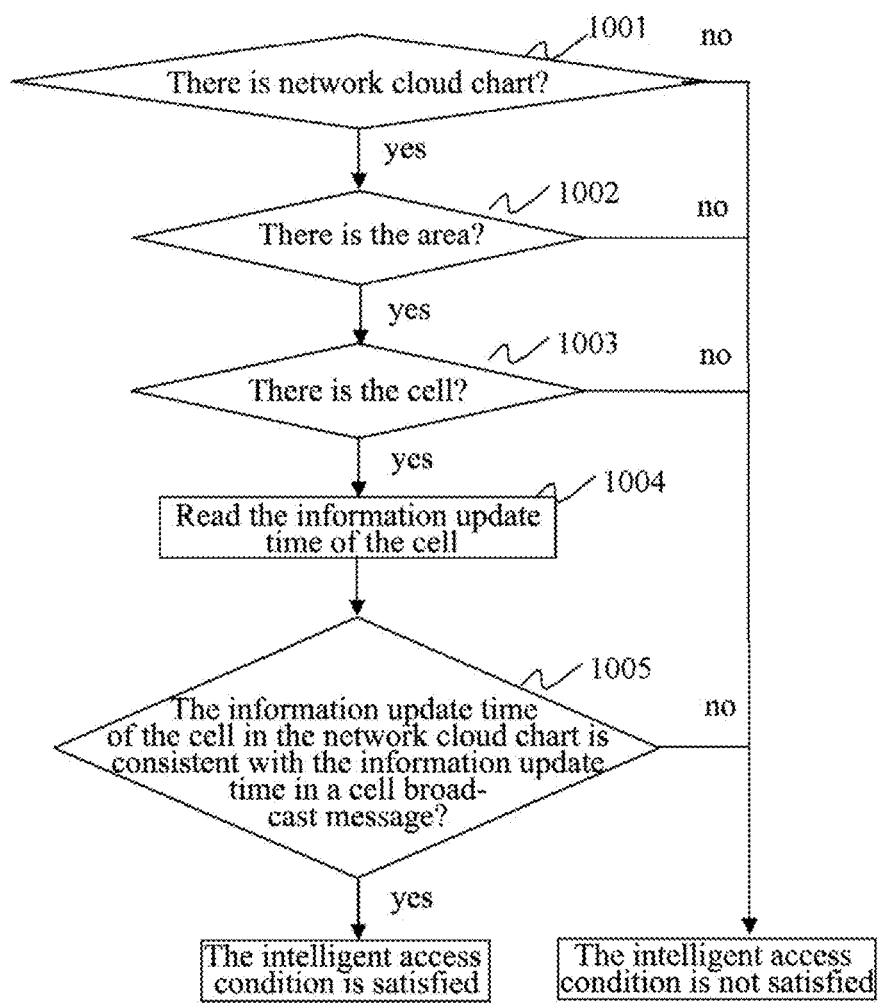
FIG. 10 is a flow diagram of intelligent access condition determination.

More specifically, as shown in FIG. 10, the process for determining that the intelligent access condition is satisfied comprises:

In step 1001, it is to determine whether the network cloud chart is stored, if yes, step 1002 is executed and if not, it is determined that the intelligent access condition is not satisfied.

If GPS is out of service, the terminal may perform matching on cell information in the network cloud chart based on measurements of serving cells and adjacent cells and determine synthetically a relationship between the network where it is currently located and the network cloud chart in conjunction with the previous historical information of the terminal. If the relationship can not be determined, then the stored network cloud chart is believed to become invalid temporally and the intelligent access condition can not be satisfied.

In step 1002, it is to determine whether the network cloud chart contains the current area, if yes, step 1003 is executed and if not, it is determined that the intelligent access condition is not satisfied;

In step 1003, it is to determine whether the current area contains the cell information, if yes, step 1004 is executed and if not, it is determined that the intelligent access condition is not satisfied;

In step 1004, the information update time of the cell is read;

In step 1005, it is to determine whether the stored information update time of the cell is consistent with an information update time of the cell in a cell broadcast message, if yes, it is determined that the intelligent access condition is satisfied and if not, it is determined that the intelligent access condition is not satisfied.

Figure 1:
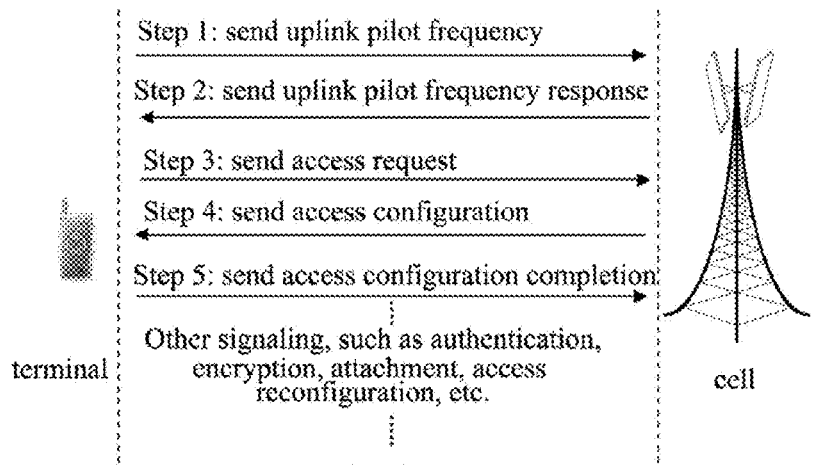
FIGS. 1 and 2 are schematic diagrams of the traditional wireless air interface access procedure and wireless air interface handover procedure of the third generation mobile communication system (3G) and the fourth generation mobile communication system (4G) respectively.

In step 7022, the cell sends an uplink pilot frequency response MSG2 after receiving MSG1;

In step 7023, the terminal sends an access request MSG3, which is equivalent to the RRR connection request or RRC connection reestablishment request in the traditional access procedure in 4G or the RRC connection reconfiguration completion in the traditional access procedure and carries access reasons (one of A, B, C, D and E) and a valid network indicator allocated when the terminal is attached to the network previously. If the terminal is attached to the network (e.g., just starting up) previously and has no network indicator, then the temporary network indicator, such as a cell-radio network temporary indicator (C-RNTI), allocated to the terminal through MSG2 by the cell is carried in MSG3 sent by the terminal FIGS. 11 and 12 are flow charts of random access procedures of a terminal supporting intelligent access which are the most simplified in an access scene and a handover scene in accordance with an embodiment of the present document. Compared with the traditional access procedure in FIG. 1 and the traditional handover procedure in FIG. 2, it can be seen that the new procedure simplifies wireless air interface signaling effectively and reduces signaling overhead.

Step 703 is a terminal recognition step, wherein the cell searches for whether the terminal information shared cloud chart of the core network contains the related information of the terminal, and the terminal information shared cloud chart contains the information of the terminal which is attached or has ever been attached to the network.

As shown in FIG. 13, for a terminal accessing with an intelligent access uplink pilot frequency, the cell must search for related information of the terminal in the terminal information shared cloud chart of the core network. If it is found before the preset searching timer expires, then that terminal will be determined as an exemption intelligent terminal; and if it is not found before the preset searching timer expires, then that terminal will be determined as an intelligent terminal to be inspected.

For a terminal accessing with a non-intelligent access uplink pilot frequency, the cell may search for related information of the terminal in the terminal information shared cloud chart of the core network. If it is found before the preset searching timer expires, then this terminal will be determined as an exemption ordinary terminal; and if it is not found before the preset searching timer expires, then this terminal will be determined as an ordinary terminal to be inspected. Alternatively, the cell and the core network may also process the terminal accessing with a non-intelligent access uplink pilot frequency according to the existing mechanism, i.e., process the traditional access and handover in traditional manners.

Step 704 is a parameter configuration step, wherein a parameter configuration procedure is performed.

The parameter configuration will be explained below by taking all terminal common air interface configuration parameters contained in the network cloud chart as an example. Generally speaking, the parameter configuration includes the following aspects:

The first parameter (SS1_1) configuration: wireless air interface common parameter configuration;

The second parameter (SS1_2) configuration: wireless air interface dedicated parameter configuration;

The second parameter (SS1_2), which is a dedicated parameter, represents personalized configuration of a terminal in a cell. Some of dedicated parameters of different terminals may be configured to be the same, and some must be configured to be different. Under the development trend of resource sharing of mobile communication technologies, such personalized configuration becomes less and less, i.e., the proportion of SS1_2 in SS1 also becomes less and less;

The third parameter (SS2) configuration is security parameter configuration between a core network and a terminal, including but not limited to, authentication, safe mode, integrity protection, encryption and decryption algorithm, etc.

The fourth parameter (SS4) configuration is parameter configuration between a cell and a core network, including but not limited to: the cell to be accessed obtains and inherits the original bearing configuration of the terminal through the core network; if the cell to be accessed is different from a cell to which the terminal currently belongs in a terminal information shared cloud chart, i.e., the cell to be accessed is a new cell, then the cell to be accessed will further transfer data transmission relationship of the terminal from the original cell through the core network.

Figure 14:
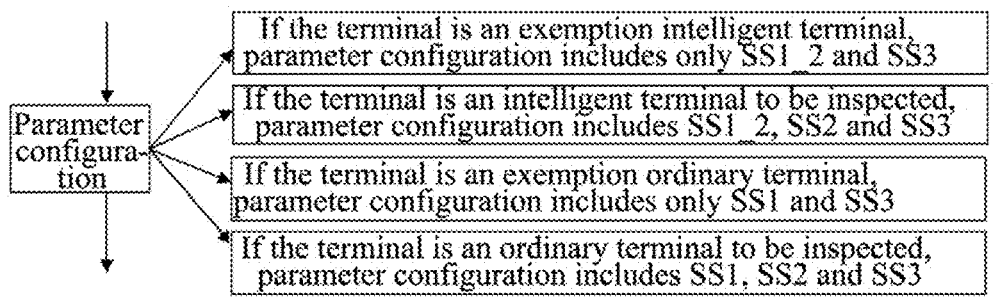
FIG. 14 is a schematic diagram of the parameter configuration step in FIG. 7.

If the related information of the terminal is contained in the shared cloud chart, then it is indicated that the terminal is an exemption terminal and the security parameter configuration procedure will not be performed; and if the related information of the terminal is not contained in the shared cloud chart, then it is indicated that the terminal is a terminal to be inspected and the security parameter configuration procedure will need to be performed. Wireless air interface common parameter configuration corresponding to the terminal common air interface configuration parameter in the network cloud chart will not be performed if the intelligent access condition is satisfied; and the wireless air interface common parameter configuration corresponding to the terminal common air interface configuration parameter in the network cloud chart will be performed if the intelligent access condition is satisfied. As shown in FIG. 14, it can be combined as the following 4 situations:

(1) Exemption intelligent terminal, which is an exemption terminal and satisfies the intelligent access condition, parameter configuration includes only SS1_2 and SS3;

(2) Intelligent terminal to be inspected, which is a terminal to be inspected and satisfies the intelligent access condition, parameter configuration includes SS1_2, SS2 and SS3;

(3) Exemption ordinary terminal, which is an exemption terminal and does not satisfy the intelligent access condition, parameter configuration includes only SS1 and SS3;

(4) Ordinary terminal to be inspected, which is a terminal to be inspected and does not satisfy the intelligent access condition, parameter configuration includes SS1, SS2 and SS3.

Step 705 is a cloud chart updating step, wherein the terminal updates the network cloud chart stored by itself when the information is changed, and the cell updates the terminal information shard cloud chart stored by the core network.

Figure 15:
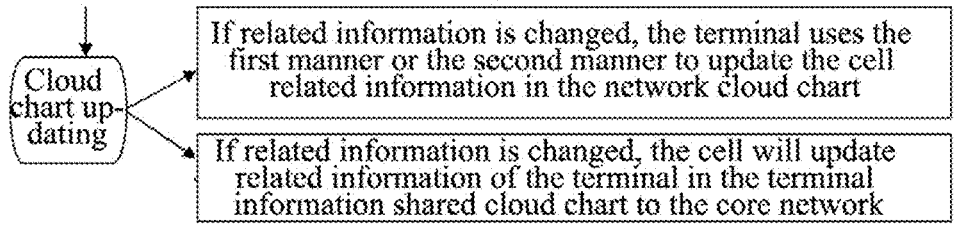
FIG. 15 is a schematic diagram of the cloud chart updating step in FIG. 7.

As shown in FIG. 15, the cloud chart updating includes the terminal updating both the network cloud chart in its own memory and the terminal information shared cloud chart on the core network. The terminal updates the related information of the cell to be accessed in the network cloud chart in its own memory in the following two manners:

The first manner: if the terminal further configures the common parameter SS1_1 during the parameter configuration stage of the access, then the terminal will update the common parameter SS1_1 acquired during the parameter configuration stage and the common parameter SS0 acquired by reading a cell broadcast message to the wireless air interface configuration parameter of the cell in the network cloud chart stored by the terminal. Accordingly, the information update time of the cell is modified as the information update time in the cell broadcast message.

The second manner: the terminal accesses to Internet, downloads and updates the related information of the cell to be accessed in the network cloud chart.

The cell updating the related information of the terminal in the terminal information shared cloud chart on the core network includes two operations, modification and establishment. If the cell finds the related information of the terminal in the terminal information shared cloud chart, then the updating is the modification operation, and if the related information is not found, then the updating is the establishment operation. A deleting operation of the related information of the terminal in the terminal information shared cloud chart is initiated actively after a timer is started and expires during terminal lifetime.

The best mode of the network cloud chart in the embodiments of the present document will be described in detail below.

The network cloud chart described in the embodiments of the present document is an electronic map containing information update time of related information of each cell and related information of the corresponding cells in mobile communication networks.

Time granularity of the information update time may be day, hour, or even minute. If the information in the network cloud chart is updated with a period of day, for example, if it is updated at 0:00 each day, then the granularity of the information update time is day. If it is updated according to event triggering, for example, if information of a certain cell is changed and is informed to be synchronized to the Internet server which stores the network cloud chart, then the granularity of the information update time may be minute. If the cell does not support intelligent access, then the information update time is a default value, such as 0.

The cell related information includes:

1. Cell identification information for identifying a cell. The significance of the cell identification information lies in distinguishing different cells. Specifically, the cell identification information includes scrambling code for distinguishing cells in 3G, and physical cell identifier for distinguishing cells in 4G. Optionally, the cell identification information can also include geographical location information. Specific geographical location information may be longitude and latitude of the cell, or according to requirements, with addition of the height above sea level, extending from planimetric map to tridimensional map.

2. Wireless air interface configuration parameters, which are various common parameters configured by the cell for the terminal, including broadcast message, and various common parameters configured by the cell for the terminal during the access procedure and handover procedure—adjacent cell information in the common parameters may embody adjacent cells in which the individual offset is not 0. For 4G, wireless air interface configuration parameters include SI (system information), SecurityConfig (security configuration), UE_TimersAndConstants (timer and counter of UE), RadioResourceConfigCommon (radio resource common configuration), terminal individual independent configuration in RadioResourceConfigDedicated (radio resource dedicated configuration), and MeasConfig (measurement configuration).

3. Extended field, which is used for enriching and extending information of the network cloud chart, e.g., increasing covering directions of the cell.

The network cloud chart is a database of information of mobile communication cellular network cells, stored on a server of the Internet (public extranet) for free download, storage and use by the terminal. The terminal is not limited to be connected to the server through mobile communication networks described in the present document to download the network cloud chart, while it can be connected to the server in any network manner, such as wire, wireless, etc., to download the network cloud chart.

When the related information is changed, each cell in a cellular network will update the up-to-date information to the network cloud chart on the Internet through the core network according to an agreed mechanism, such as period triggering or event triggering updating.

The terminal may acquire and update the cell related information from the network cloud chart on the Internet, or may acquire the up-to-date information of the cell by reading the broadcast message of the cell to be accessed and the wireless air interface parameter configured by the cell for the terminal during the access process, and may update the cell related information (such as wireless air interface configuration parameter) and the information update time in the network cloud chart stored by the terminal.

The wireless air interface configuration parameters of each cell in the network cloud chart are common to all terminals which access to this cell, i.e., they are irrelevant to the terminal individuals. Therefore, the present document is more suitable for next generation mobile communication systems and partially modified 4G networks and 3G HSPA+ networks. Because all channel resources in cells basically are shared and scheduled in these networks, wireless air interface configuration parameters between terminals are basically no difference.

Because wireless air interface configuration parameters of different cells are also alike except for slight differences, several sets of typical configuration templates may be formed and normalized and used for indexing the cells. Thus, the stored amount of information can be reduced greatly to facilitate storage, transmission and processing of the network cloud chart by the terminal and the Internet server which store the network cloud chart.

Network cloud charts on the Internet are controlled by carrier operators of the related networks, the other parties have no right to establish, delete and modify them. Network cloud charts on terminals cannot be modified at will either, and they must be updated in manners described in the present document in order to prevent inaccurate information from occurring, resulting in failure of communication.

In the initial stage of construction of mobile communication networks, since the networks are in adjustment and optimization stage, updating of network cloud charts will be more frequent. After the networks become more mature, the network cloud charts will be stabilized accordingly.

The best mode of the terminal information shared cloud chart in the embodiments of the present document will be described in detail below.

The terminal information cloud chart described in the embodiments of the present document is an electronic map containing related information of each terminal which is attached or has ever been attached to the network in mobile communication networks, and it is an information database stored on a core network (dedicated intranet) to which the mobile communication network described in the present document belongs. The cell related information includes:

1. Network identifier allocated for the terminal in the network to which the terminal is attached, i.e., UE-Context (terminal context information), such as a globally unique temporary identifier (GUTI);

2. Network identifier of the cell to which the terminal currently belongs, such as scrambling code of a 3G cell and physical cell identifier (PCI) of a 4G cell;

3. Geographical location of the cell to which the terminal currently belongs, which is consistent with cell geographical information in the network cloud chart.

4. Timer of lifetime. If the current cell finds that the terminal disconnects the communication with the current cell due to initiating de-attachment or due to failure of wireless links or due to handover, the current cell will send a deactivation message to the terminal information shared cloud chart. When the terminal information shared cloud chart receives the deactivation message sent by the current cell, the timer of lifetime of the terminal will be started. Before the timer expires, if the terminal information sent by a new cell (including the current cell) is received, then the related information of the terminal will be updated and the timer will also stop timing and return to zero. After the timer expires, if the terminal information sent by the new cell is not received, then the terminal and the related information of the terminal will be deleted in the shared cloud chart. The timer of lifetime can be set synthetically according to factors such as communication service characteristics of the terminal, security considerations and update of tracking area, for example, it can be set as 1 hour or 1 day.

5. Extended field, which is used for enriching and extending information of the terminal information shared cloud chart, such as increasing the capacity of the terminal, international mobile equipment identity (IMEI) of the terminal, international mobile subscriber identification number (IMSI), etc.

In order to support high-capacity users, the network may allocate repeated terminal network identifiers to different terminals in different cells. Therefore, cell information added in the terminal information shared cloud chart can be used to distinguish these terminals.

When the cell to be accessed by the terminal is changed, the new cell has to search for this terminal in the terminal information shared cloud chart of the core network. If the terminal is found and determined to be the same terminal (using geographical information of the new cell and the original cell to determine), the related information is be updated. If the terminal is not found, the related information of the terminal will be newly established.

Terminal information shared cloud charts are also controlled by carrier operators, the other parties have no right to establish, delete and modify them.

The terminal described in the embodiments of the present document needs to satisfy and support the following functions:

1. Autonomous downloading, storage, update, management and application of the network cloud chart. The terminal may access, without limitation of time, location, network and manner, to the Internet server where the network cloud chart is placed, and download network cloud charts with a certain size according to storage capacity and geographical activity range of the terminal. For example, the terminal can download a network cloud chart of an area where it is located, download a network cloud chart of a frequent activity area, download a network cloud chart of a dedicated network of the currently taken high-speed railway, etc. The downloaded information takes a cell as a unit. When the cell information is updated, if the terminal finds that information update time of the cell in its stored network cloud chart is not earlier than the information update time of the corresponding cell in the network cloud chart on the Internet server, then this cell information will remain unchanged, i.e., be not updated. The terminal will decide the update time autonomously, for example, it can update the network cloud chart periodically, or it can decide whether to update the network cloud chart autonomously in conjunction with movement situations, serving cell situations, etc. The terminal can delete autonomously network cloud charts which are used for a long time.

2. Compatible support for intelligent access and traditional access and handover. The intelligent access is access which is initiated using some of uplink pilot frequencies (which are defined herein as intelligent access uplink pilot frequencies) divided specially from the cell to be accessed when the terminal determines that there is valid information of the cell to be accessed in its stored network cloud chart, while the traditional access and handover is the access which is initiated using other uplink pilot frequencies (which are defined herein as non-intelligent access uplink pilot frequencies) than the intelligent access uplink pilot frequencies when the terminal determines that there is no valid information of the cell to be accessed in its stored network cloud chart. For the latter, after the terminal accesses to the cell, it updates the cell related information and the information update time of the cell to be accessed in its stored network cloud chart in conjunction with a cell broadcast message and wireless air interface parameters configured by the cell for the terminal during the access process. The information update time is updated as an information update time in the cell broadcast message.

Figure 2:
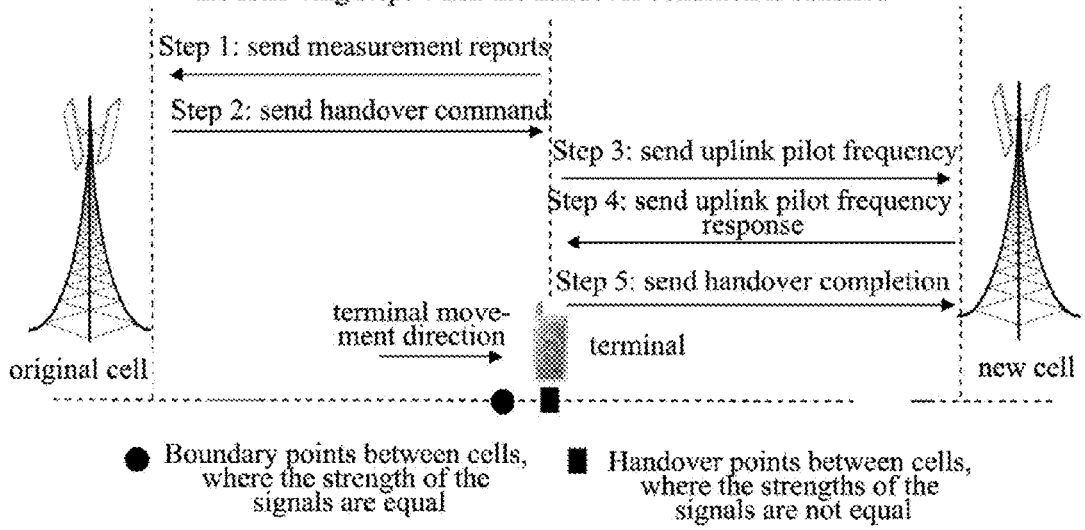

3. In the intelligent access handover scene, i.e., after the terminal finds during continuous measurement that the cell handover condition is satisfied, the terminal does not need to send measurement reports to the original cell and receive a handover command from the original cell, but initiates, directly in the new cell, an intelligent access with the access reason being C, i.e., a random access during handover. Thus, stages when the channel condition is the worst in the traditional handover process, i.e., step 1 and step 2 in FIG. 2, are avoid, lowering the risk of interruption of communication due to failure of handover.

4. In the traditional handover scene, the terminal which supports the intelligent access no longer sends measurement reports to the original cell and receives a handover command from the original cell, but initiates, directly in the new cell, a traditional access with the access reason being B, i.e., an initial access initiated after failure of wireless links (please note, not C, i.e., a random access during handover), i.e., an RRC connection reestablishment request, thus avoiding stages when the channel condition is the worst shown in step 1 and step 2 in FIG. 2.

5. If GPS is out of service, the terminal may perform matching of cell information in the network cloud chart based on measurements of serving cells and adjacent cells and determine a synthetically relationship between the network where it is currently located and the network cloud chart in conjunction with the previous historical information of the terminal. If the relationship can not be determined, then the stored network cloud chart is believed to become invalid temporally and the intelligent access condition is not satisfied.

According to design of the network cloud chart in the embodiments of the present document, the amount of information of one cell is no more than 10 Kbit, so the total amount of information of 3,000 cells under 1,000 base stations (each base station has 3 cells) is also no more than 30 MBit. Because wireless air interface configuration parameters of most of the cells are all consistent, several sets of typical configuration templates may be formed and normalized and used for indexing the cells, so the actual total amount of information is much less. With regards to current and later storage capacity of the terminal, the terminal has no problem with the storage of the information.

One of design requirements for processing capacity of the terminal is to be able to support data transmission of peak flow. However, in actual applications, it is very rare that such case occurs, what is more, this will not occur in the access process. The terminal has enough processing capacity redundancy to complete processing associated with intelligent access.

The cell described in the embodiments of the present document, preferably, satisfies and supports the following functions:

1. One information update time, format of which is consistent with that in cell information in the network cloud chart, is added to an extended or reserved field of a broadcast message. If there is no such field or the value of the field is default 0, it is shown that the cell does not support intelligent access;

2. In order to be compatible with intelligent access and traditional access and handover, the cell needs to class, according a certain rules, uplink pilot resources of random access, some of which are used for intelligent access and defined herein as intelligent access uplink pilot frequencies, and others can be subdivided to be used for the traditional access and handover and referred collectively as non-intelligent access uplink pilot frequencies. Therefore, one intelligent access uplink pilot frequency is added to the extended or reserved field of the broadcast message, while an uplink pilot frequency field used for the traditional access and handover in the broadcast message will continue to be reserved, only pilot resources is decreased relatively.

3. When the related information of the cell is changed, the cell will update the network cloud chart over the Internet server according to conventional mechanism, such as period triggering or event triggering updating.

The complete terminal access procedure is as follows:

In Step 1201, a terminal which supports intelligent access finds and selects a best cell through signal measurements;

In Step 1202, a broadcast message of this cell is read;

In Step 1203, the terminal determines whether the cell is congested through the cell broadcast message, if it is congested, returns back to the first step and reselects a new cell, and proceeds to the next stop if it is not congested.

In Step 1204, the terminal searches its own memory and determines in turn whether a valid network cloud chart is stored, whether the network cloud chart contains the current area, whether the current area has the cell information, and whether the information update time in the cell information is consistent with that in the cell broadcast message. If all the above determinations are yes, then it will be determined that the terminal satisfies the intelligent access condition of this cell; and as long as one of the above determinations is no, it will be determined that the terminal does not satisfy the intelligent access condition of this cell, and the next step will be performed;

In Step 1205, the terminal sends MSG1 to the cell. If the intelligent access condition is satisfied, then MSG1 is the intelligent access uplink pilot frequency; and if the intelligent access condition is not satisfied, then MSG1 is the non-intelligent access uplink pilot frequency;

In Step 1206, the cell sends MSG2 to the terminal;

In Step 1207, the terminal sends MSG3 to the cell, and access reasons are determined according to actual real situations. When the intelligent access condition is satisfied, the access reasons covers A, B, C, D and E; when the intelligent access condition is not satisfied, the access reasons covers A, B, D and E;

In Step 1208, the cell searches for related information of the terminal in a terminal information shared cloud chart of a core network. If it is found before the preset searching timer expires, then this terminal will be determined as an exemption intelligent terminal when the intelligent access condition is satisfied and be determined as an exemption ordinary terminal when the intelligent access condition is not satisfied; and if it is not found before the preset searching timer expires, then that terminal will be determined as an intelligent terminal to be inspected when the intelligent access condition is satisfied and be determined as a ordinary terminal to be inspected when the intelligent access condition is satisfied, and the next step will be performed;

In Step 1209, parameter configurations are completed, wherein if the terminal is an exemption intelligent terminal, then dedicated parameter configuration of SS1_2 is completed between the cell and the terminal, and parameter configuration of SS3 is completed between the cell and the core network; if the terminal is an intelligent terminal to be inspected, then dedicated parameter configuration of SS1_2 is completed between the cell and the terminal, parameter configuration of SS2 is completed between the core network and the terminal, and parameter configuration of SS3 is completed between the cell and the core network; if the terminal is an exemption ordinary terminal, then parameter configuration of SS1 (including the common parameter SS11_2 and the dedicated parameter SS1_2) is completed between the cell and the terminal, and parameter configuration of SS3 is completed between the cell and the core network; and if the terminal is an ordinary terminal to be inspected, then parameter configuration of SS1 (including the common parameter SS11_2 and the dedicated parameter SS1_2) is completed between the cell and the terminal, parameter configuration of SS2 is completed between the core network and the terminal, and parameter configuration of SS3 is completed between the cell and the core network;

In Step 1210, if there are changes in the related information, the terminal will update the related information of the cell in its stored network cloud chart and the cell will update the related information of the terminal in the terminal information shared chart.

Figure 16:
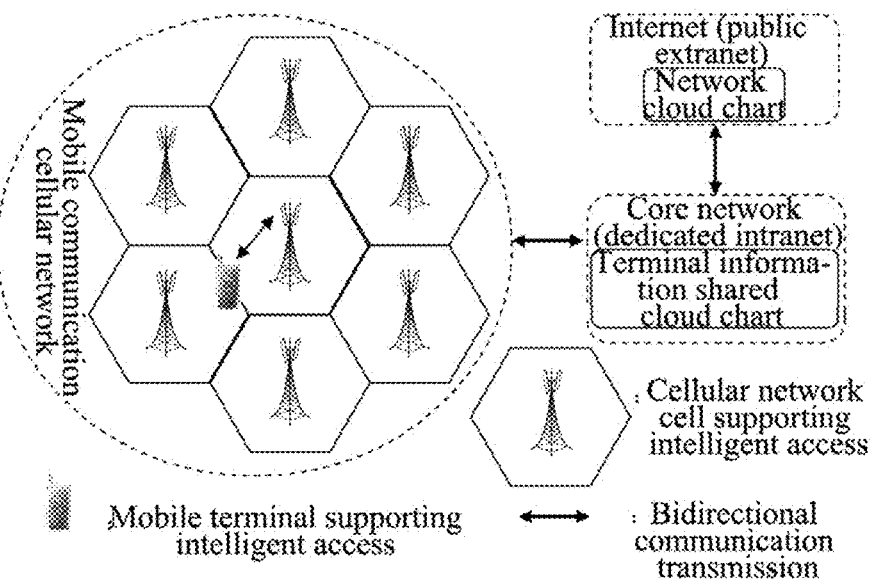
FIG. 16 is a schematic diagram of four network elements involved in the methods in accordance with the embodiments of the present document.

FIG. 16 is a schematic diagram of four network elements involved in the methods in accordance with the embodiments of the present document. The four network elements are a cell of a mobile communication cellular network which supports intelligent access, a terminal which supports intelligent access, a core network containing a terminal information shared cloud chart, and the Internet containing a network cloud chart.

Figure 17:
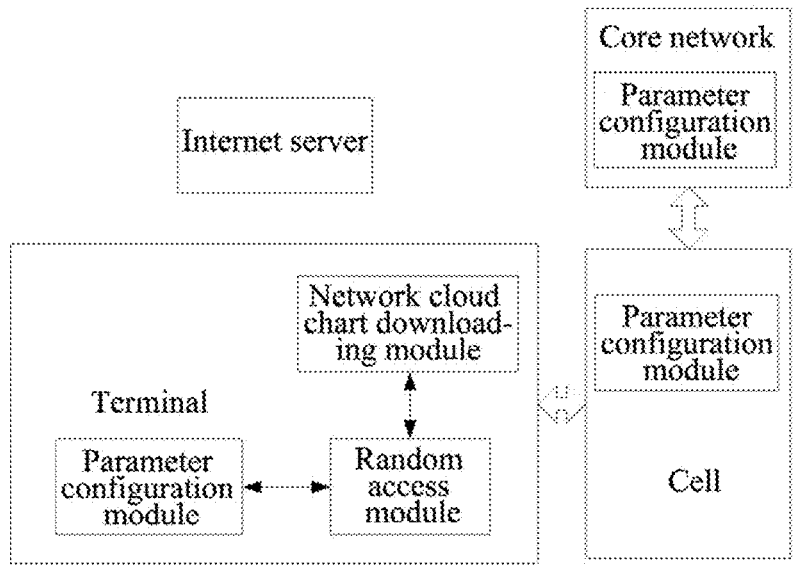
FIG. 17-20, 22 are block diagrams of modules of various terminal access systems in accordance with various embodiments of the present document.

With regards to the first and second method embodiments described above, one embodiment of the present document provides a terminal access system, which, as shown in FIG. 17, comprises:

an Internet server, configured to store a network cloud chart containing cell related information, wherein the cell related information includes a terminal common air interface configuration parameter of a cell, and the terminal common air interface configuration parameter of the network cloud chart and/or a cell broadcast message includes a first uplink pilot frequency for intelligent access;

a network cloud chart downloading module of the terminal, configured to download from the Internet server according to a predefined strategy and store the network cloud chart containing the cell related information;

a random access module of the terminal, configured to interact with the cell and perform a random access procedure, wherein the first uplink pilot frequency is sent if the network cloud chart stored by the network cloud chart downloading module includes the cell related information of the cell to be accessed and the cell related information is valid, and a second uplink pilot frequency for non-intelligent access is sent if the network cloud chart stored by the network cloud chart downloading module does not include the cell related information of the cell to be accessed or the cell related information is invalid; and parameter configuration modules of the terminal, the cell and a core network, configured to perform a wireless air interface parameter configuration procedure, wherein terminal common air interface configuration corresponding to the terminal common air interface configuration parameter in the network cloud chart is not performed if the terminal sends the first uplink pilot frequency, and the terminal common air interface configuration corresponding to the terminal common air interface configuration parameter in the network cloud chart is performed if the terminal sends the second uplink pilot frequency.

Figure 18:
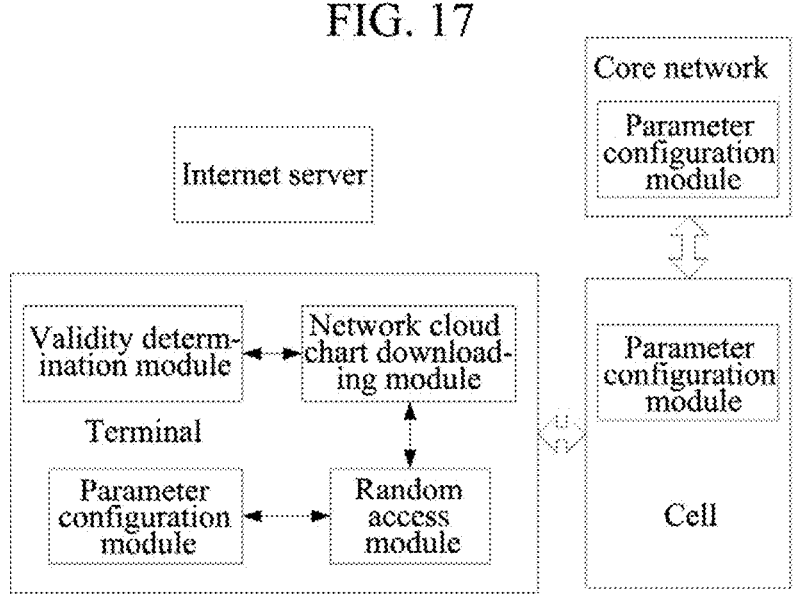

Preferably, the network cloud chart further includes information update time corresponding to the cell related information, which further contains cell identification information for identifying the cell. The cell broadcast message carries the information update time of the cell related information in the network cloud chart. As shown in FIG. 18, in another embodiment of the terminal access system of the present document, compared with the system shown in FIG. 17, the system further comprises:

a validity determination module of the terminal, configured to receive the cell broadcast message and determine whether the cell related information of the cell to be accessed has been stored according the cell identification information before performing random access; determine whether the information update time in the cell broadcast message is consistent with the information update time of the stored cell related information when determining that it has been stored, determine that it is valid if consistent, and determine that it is invalid if inconsistent.

Preferably, the cell to be accessed is selected by the terminal according to measurement results.

Figure 19:
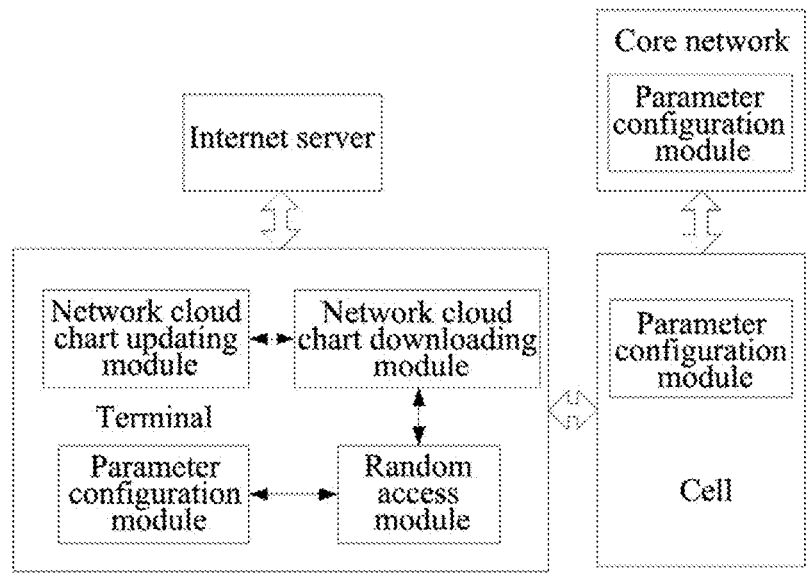

As shown in FIG. 19, in the third embodiment of the terminal access system of the present document, compared with the system shown in FIG. 17, the system further comprises:

a network cloud chart updating module of the terminal, configured to update the cell related information of the cell in its stored network cloud chart according the terminal common air interface configuration result after performing the terminal common air interface configuration and update its stored information update time according to the information update time in the received cell broadcast message.

In the fourth embodiment of the terminal access system of the present document, compared with the system shown in FIG. 17, as shown in FIG. 19, the system further comprises:

a shared cloud chart storing module of a core network, configured to store a terminal information shared cloud chart containing related information of the terminal which is attached or has ever been attached to the network; and a terminal recognition module of the cell, configured to determine whether the terminal information shared cloud chart stored by the core network contains the related information of the terminal.

When the terminal information shared cloud chart contains the related information of the terminal, the parameter configuration modules of the terminal, the cell and the core network do not perform the security parameter configuration procedure; and when the terminal information shared cloud chart does not contain the related information of the terminal, the security parameter configuration procedure is performed.

Preferably, the parameter configuration performed by the parameter configuration modules of the cell and the core network further includes inheriting the existing bearing configuration and a transferring data transmission relationship during handover of the cell.

Figure 20:
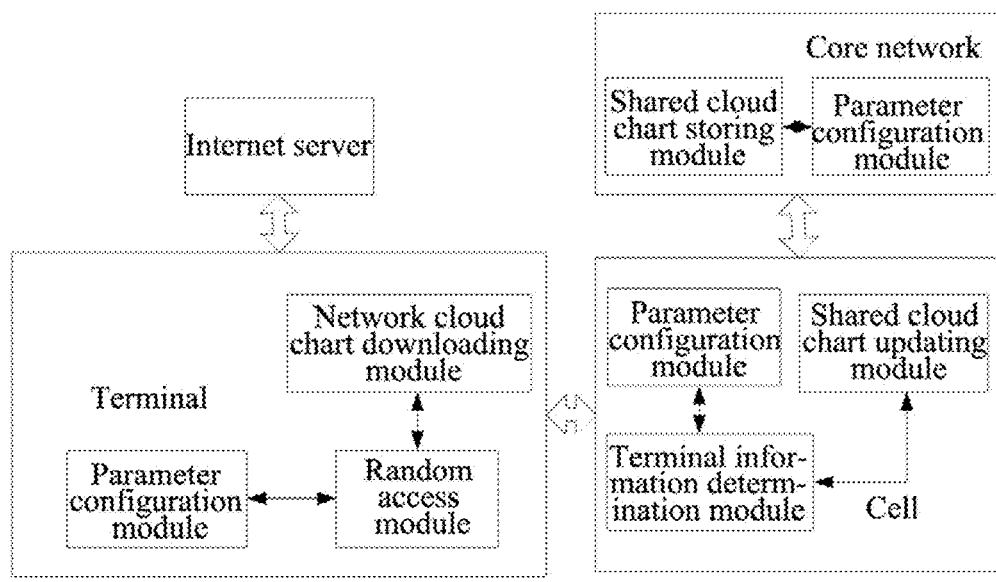

As shown in FIG. 20, the system further comprises a shared cloud chart updating module of the cell configured to send a terminal information update message to the core network when there are changes in the related information of the terminal.

The shared cloud chart storing module of the core network is further configured to update the terminal information shared cloud chart according to the terminal information update message.

The shared cloud chart updating module of the cell is further configured to send a deactivation message to the shared cloud chart storing module of the core network when communication between the cell and the terminal is disconnected.

The shared cloud chart storing module of the core network is further configured to start a timer according to the deactivation message, delete the related information of the deactivated terminal if the timer expires and the terminal information update message is not received.

Preferably, the random access module of the terminal interacting with the cell includes sending an uplink pilot frequency to the cell to be accessed and sending an access request after receiving the uplink pilot frequency response, wherein the second uplink pilot frequency will be sent if the terminal determines that it is needed to hand over to a new cell according to measurement results, and the access reason carried in the access request is an initial access initiated after failure of wireless links.

Preferably, the cell broadcast message further carries cell running state information. If the cell running state information indicates the current cell is in a congestion state, then the random access module of the terminal reselects a cell to be accessed to perform the random access procedure.

Figure 21:
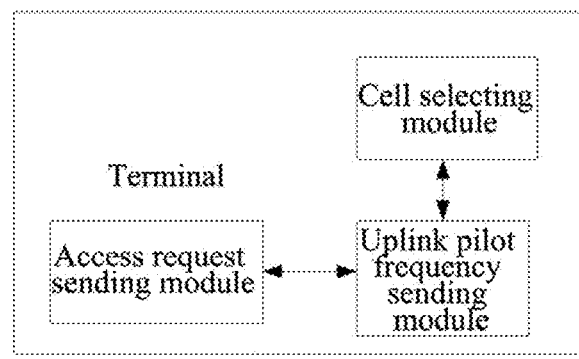
FIG. 21 is a block diagram of modules of a terminal in accordance with an embodiment of the present document.

With regards to the third method embodiment, one embodiment of the present document further provides a terminal, which, as shown in FIG. 21, comprises:

a cell selecting module, configured to select a new cell to be accessed after determining that it is needed to hand over to the new cell according to measurement results;

an uplink pilot frequency sending module, configured to send an uplink pilot frequency; and an access request sending module, configured to send an access request after receiving an uplink pilot frequency response sent at a network side, wherein an initiating access reason contained in the access request is an initial access initiated after failure of wireless links.

Figure 22:
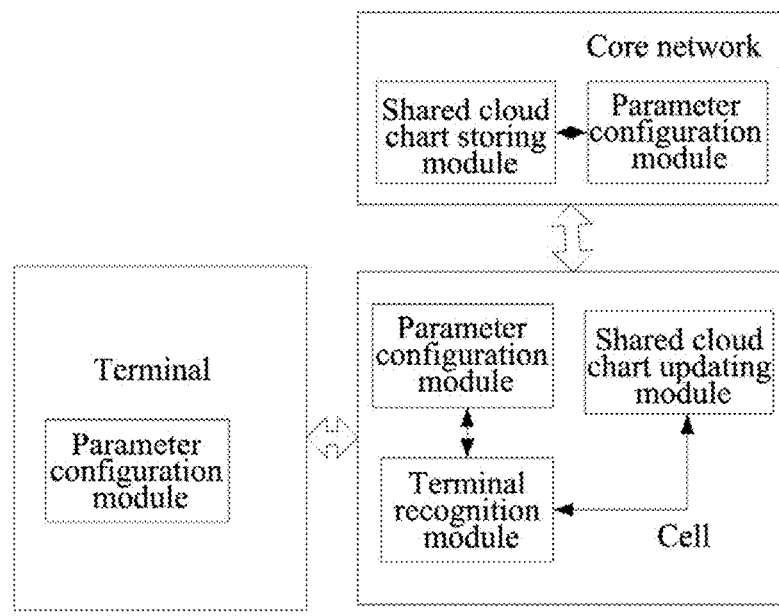

With regards to the fourth method embodiment, one embodiment of the present document further provides another terminal access system, which, as shown in FIG. 22, comprises:

a shared cloud chart storing module of a core network, configured to store a terminal information shared cloud chart containing related information of a terminal which is attached or has ever been attached to the network and update the terminal information shared cloud chart according to a terminal information update message;

a terminal recognition module of a cell, configured to search for whether the terminal information shared cloud chart of the core network contains the related information of the terminal after receiving an access request sent by the terminal;

parameter configuration modules of the core network, the cell and the terminal, configured to perform a parameter configuration procedure, wherein security parameter configuration is not performed if the terminal information shared cloud chart contains the related information of the terminal and the security parameter configuration is performed if the terminal information shared cloud chart does not contain the related information of the terminal; and a shared cloud chart updating module of the cell, configured to send the terminal information update message to the core network when the related information of the terminal is changed.

The shared cloud chart updating module of the cell is further configured to send a deactivation message to the shared cloud chart storing module of the core network when communication between the cell and the terminal is disconnected.

Preferably, the shared cloud chart storing module of the core network is further configured to start a timer according to the deactivation message, delete the related information of the deactivated terminal if the timer expires and the terminal information update message is not received.

Additionally, one embodiment of the present document further provides a terminal for implementing the first, second or fifth embodiments, and the terminal comprises:

a network cloud chart downloading module, configured to download according to a predefined strategy and store a network cloud chart containing cell related information, wherein the cell related information includes a terminal common air interface configuration parameter of a cell, the terminal common air interface configuration parameter of the network cloud chart and/or a cell broadcast message includes a first uplink pilot frequency for intelligent access;

an random access module, configured to interact with the cell and perform a random access procedure, wherein the first uplink pilot frequency is sent if the network cloud chart stored by the network cloud chart downloading module includes the cell related information of the cell to be accessed and the cell related information is valid, and a second uplink pilot frequency for non-intelligent access is sent if the network cloud chart stored by the network cloud chart downloading module does not include the cell related information of the cell to be accessed or the cell related information is invalid; and a parameter configuration module, configured to perform a wireless air interface parameter configuration procedure, wherein terminal common air interface configuration corresponding to the terminal common air interface configuration parameter in the network cloud chart is not performed if the first uplink pilot frequency is sent, and the terminal common air interface configuration corresponding to the terminal common air interface configuration parameter in the network cloud chart is performed if the second uplink pilot frequency is sent.

Preferably, the network cloud chart further includes an information update time corresponding to the cell related information, the cell related information further contains cell identification information for identifying the cell. The cell broadcast message carries the information update time of the cell related information in the network cloud chart. The terminal further comprises:

a validity determination module of the terminal, configured to receive the cell broadcast message and determine whether the cell related information of the cell to be accessed has been stored according the cell identification information before performing random access; determine whether the information update time in the cell broadcast message is consistent with the information update time of the stored cell related information when determining that it has been stored, determine that it is valid if consistent and determine that it is invalid if inconsistent.

Preferably, the cell to be accessed is selected by the terminal according to measurement results.

Preferably, the terminal further includes:

a network cloud chart updating module, configured to update the cell related information of the cell in its stored network cloud chart according to the terminal common air interface configuration result after performing the terminal common air interface configuration, and update its stored information update time according to the information update time in the received cell broadcast message.

The embodiments of the present document are suitable for mobile communication systems based on channel resource sharing and scheduling, and the mechanism based on channel resource sharing and scheduling is also the development trend of the mobile communication systems. In a standard evolution process of the mobile communication systems, this mechanism is established basically in both HSPA+ in a later stage of 3G and 4G, while this mechanism will be applied more thoroughly by the next generation mobile communication systems. Therefore, the present document is more suitable for the next generation mobile communication systems, and HSPA+ of 3G and 4G, after reformed and upgraded properly, may employs the present document.

Compared with the traditional access and handover, intelligent access in the terminal access methods in accordance with the embodiments of the present document is simplified significantly in signaling, and a signaling stage (step 1 and step 2 in FIG. 2) in which the wireless channel condition is worst in the traditional handover procedure is avoided. Therefore, the embodiments of the present document may decrease air interface delay of access and handover effectively and improve success ratio of access and handover, while reducing signaling overheads greatly and decreasing co-channel interference, such that the network enables resources and energy sources to be more used to transmit truly effective data, thereby improving utilization of resources, which is beneficial to improvement of service performance of handover areas at the cell edge under co-channel networking.

Obviously, it is should be understood by those skilled in the art that various modules or various steps in the present document described above may be implemented by general purpose computing devices or integrated on a single computing device or distributed across a network comprised of a plurality of computing devices. Alternatively, they may be implemented using computing device executable program codes and then be stored in storage devices for performing by the computing devices. In addition, in certain cases, the steps shown or described may be performed in a different order than that described herein, or they may be made into various integrated circuit modules, or a plurality of modules or steps of them may be made into a single integrated circuit module. Thus, the present document is not limited to any combination of specific hardware and software.

INDUSTRIAL APPLICABILITY

In the terminal access methods in accordance with the embodiments of the present document, an Internet server of a core network is used to pre-store configuration parameters implemented by signaling interaction in the access process, in order to prevent a terminal from performing too much signaling interaction, reducing signaling overheads. For the handover scene, the embodiments of the present document avoid stages in which interference is serious during interaction with the original cell by selecting directly a cell to be accessed and initiating the access process to a target cell.

What we claim is:

1. A terminal access method, comprising:
   a terminal downloading from an Internet server a network cloud chart containing cell related information, wherein the cell related information includes a terminal common air interface configuration parameter of the cell, and a core network stores a terminal information shared cloud chart containing related information of a terminal which is attached or has ever been attached to the network, and wherein the method comprises:
   a cell selecting step, wherein the terminal selects a cell to be accessed according to measurement results;
   a random access step, wherein a random access procedure is performed, and a terminal recognition step is performed subsequent to the random access procedure if the network cloud chart downloaded by the terminal satisfies an intelligent access condition, the terminal recognition step or a parameter configuration step is performed subsequent to the random access procedure if the network cloud chart downloaded by the terminal does not satisfy the intelligent access condition;
   the terminal recognition step, wherein the cell searches for whether the terminal information shared cloud chart of the core network contains the related information of the terminal, the terminal information shared cloud chart contains the information of the terminal which is attached or has ever been attached to the network;
   the parameter configuration step, wherein a parameter configuration procedure is performed, and a security parameter configuration procedure is not performed if the cloud chart contains the related information of the terminal, and wireless air interface common parameter configuration corresponding to the terminal common air interface configuration parameter in the network cloud chart is not performed if the intelligent access condition is satisfied; and
   a cloud chart updating step, wherein the terminal updates the network cloud chart stored by itself when the information is changed, and the cell updates the terminal information shard cloud chart stored by the core network.

2. The method according to claim 1, wherein the network cloud chart further includes an information update time corresponding to the cell related information, the cell related information further contains cell identification information for identifying the cell, a cell broadcast message carries the information update time of the cell related information in the network cloud chart, and the terminal determining that the intelligent access condition is satisfied comprises:
   the terminal receiving the cell broadcast message and determining whether the cell related information of the cell to be accessed has been stored according to the cell identification information; if the cell related information of the cell to be accessed has been stored, determining whether an information update time in the cell broadcast message is consistent with the information update time of the cell related information stored by the terminal, and if consistent, determining that the intelligent access condition is satisfied and if inconsistent, determining that the intelligent access condition is not satisfied,
   or,
   wherein the random access procedure comprises:
   the terminal sending an uplink pilot frequency to the cell to be accessed;
   the cell sending an uplink pilot response to the terminal after receiving the uplink pilot frequency; and
   the terminal sending an access request after receiving the uplink pilot frequency, wherein if the terminal determines that it is needed to hand over to a new cell according to measurement results, the second uplink pilot frequency is sent, an access reason carried in the access request is an initial access initiated after failure of wireless links.

3. A terminal access method, comprising:
   a terminal downloading from an Internet server and storing a network cloud chart containing cell related information, wherein the cell related information includes a terminal common air interface configuration parameter of the cell, and the terminal common air interface configuration parameter of the network cloud chart and/or a cell broadcast message includes a first uplink pilot frequency for intelligent access;

performing a random access procedure, wherein the first uplink pilot frequency is sent if the network cloud chart stored by the terminal includes the cell related information of the cell to be accessed and the cell related information is valid, and a second uplink pilot frequency for non-intelligent access is sent if the network cloud chart stored by the terminal does not include the cell related information of the cell to be accessed or the cell related information is invalid; and performing a parameter configuration procedure, wherein terminal common air interface configuration corresponding to the terminal common air interface configuration parameter in the network cloud chart is not performed if the terminal sends the first uplink pilot frequency, and the terminal common air interface configuration corresponding to the terminal common air interface configuration parameter in the network cloud chart is performed if the terminal sends the second uplink pilot frequency.

4. The method according to claim 3, wherein the network cloud chart further includes an information update time corresponding to the cell related information, the cell related information further contains cell identification information for identifying the cell, the cell broadcast message carries the information update time of the cell related information in the network cloud chart, and before the random access procedure is performed, the method further comprises:

the terminal receiving the cell broadcast message and determining whether the cell related information of the cell to be accessed has been stored according to the cell identification information; if stored, determining whether the information update time in the cell broadcast message is consistent with the information update time of the cell related information stored by the terminal, and if consistent, determining the cell related information is valid and if inconsistent, determining the cell related information is invalid, or, wherein the cell to be accessed is selected by the terminal according to measurement results, or, wherein after the terminal common air interface configuration is performed, the method further comprises:

the terminal updating the cell related information of the cell in the network cloud chart stored by itself according a terminal common air interface configuration result and updating the information update time stored by itself according to the information update time in the received cell broadcast message.

5. The method according to claim 3, wherein the random access procedure comprises:

the terminal sending an uplink pilot frequency to the cell to be accessed;

the cell sending an uplink pilot response to the terminal after receiving the uplink pilot frequency; and the terminal sending an access request after receiving the uplink pilot frequency, wherein if the terminal determines that it is needed to hand over to a new cell according to measurement results, the second uplink pilot frequency is sent, an access reason carried in the access request is an initial access initiated after failure of wireless links.

6. The method according to claim 3, wherein the cell broadcast message further carries cell running state information, and if the cell running state information indicates the current cell is in a congestion state, then the terminal reselects a cell to be accessed to perform the random access procedure.

7. The method according to claim 3, wherein the parameter configuration procedure further includes terminal dedicated parameter configuration and parameter configuration between the cell and the core network.

8. The method according to claim 3, wherein the method further comprises:

a cell selecting step, wherein if the terminal determines that it is needed to hand over to a new cell according to measurement results, the terminal selects a new cell to be accessed;

an uplink pilot frequency sending step, wherein the terminal sends an uplink pilot frequency; and an access request sending step, wherein the terminal sends an access request after receiving an uplink pilot frequency response sent by a network side, and an initiating access reason carried in the access request is an initial access initiated after failure of wireless links.

9. The method according to claim 3, wherein a core network stores a terminal information shared cloud chart containing related information of the terminal which is attached or has ever been attached to the network, and during the parameter configuration procedure, if the cell determines that the terminal information shared cloud chart contains the related information of the terminal, then a security parameter configuration procedure is not performed, and if the cell determines that the terminal information shared cloud chart does not contain the related information of the terminal, then the security parameter configuration procedure is performed.

10. The method according to claim 9, wherein after the parameter configuration procedure, if there are changes in the information of the terminal, the method further comprises: the cell sending a terminal information update message to the core network; and the core network updating the terminal information shared cloud chart according to the terminal information update message, and wherein the changes in the related information of the terminal include the following situations:

when the cell determines that communication with the terminal is disconnected, the cell sends a deactivation message to the terminal information shared chart of the core network; and the terminal information shared chart starts a timer, and if the timer expires and the terminal information update message has not been received, then the terminal information shared cloud chart deletes the related information of a deactivated terminal.

11. The method according to claim 3, wherein the method further comprises:

a core network storing a terminal information shared cloud chart, wherein the terminal information shared cloud chart contains related information of a terminal which is attached or has ever been attached to the network;

a cell searching for whether the terminal information shared cloud chart of the core network contains the related information of the terminal after receiving an access request sent by the terminal;

performing a parameter configuration procedure, wherein security parameter configuration is not performed if the terminal information shared cloud chart contains the related information of the terminal, and the security parameter configuration is performed if the terminal information shared cloud chart does not contain the related information of the terminal; and the cell updating the terminal information shared cloud chart stored by the core network when the information is changed.

12. The method according to claim 11, wherein
that the information of the terminal is changed includes the following situations:

when the cell determines that communication with the terminal is disconnected, the cell sends a deactivation message to the terminal information shared chart of the core network; and the terminal information shared chart starts a timer, and if the timer expires and a terminal information update message has not been received, then the terminal information shared cloud chart deletes the related information of a deactivated terminal.

13. A terminal, comprising a processor and a storage device, wherein the storage device stores processor-executable programs, and the programs comprise:

a network cloud chart downloading module, configured to download from an Internet server and store a network cloud chart containing cell related information, wherein the cell related information contains a terminal common air interface configuration parameter of a cell, the terminal common air interface configuration parameter of the network cloud chart and/or a cell broadcast message includes a first uplink pilot frequency for intelligent access;

an random access module, configured to interact with the cell and perform a random access procedure, wherein the first uplink pilot frequency is sent if the network cloud chart stored by the network cloud chart downloading module includes the cell related information of the cell to be accessed and the cell related information is valid, and a second uplink pilot frequency for non-intelligent access is sent if the network cloud chart stored by the network cloud chart downloading module does not include the cell related information of the cell to be accessed or the cell related information is invalid; and a parameter configuration module, configured to perform a wireless air interface parameter configuration procedure, wherein terminal common air interface configuration corresponding to the terminal common air interface configuration parameter in the network cloud chart is not performed if the first uplink pilot frequency is sent, and the terminal common air interface configuration corresponding to the terminal common air interface configuration parameter in the network cloud chart is performed if the second uplink pilot frequency is sent.

14. The terminal according to claim 13, wherein the network cloud chart further includes an information update time corresponding to the cell related information, the cell related information further contains cell identification information for identifying the cell, the cell broadcast message carries the information update time of the cell related information in the network cloud chart, and before the random access procedure is performed, the programs further comprise:

a validity determination module, configured to receive the cell broadcast message and determine whether the cell related information of the cell to be accessed has been stored according the cell identification information before performing random access; determine whether the information update time in the cell broadcast message is consistent with the information update time of the stored cell related information when determining that the cell related information of the cell to be accessed has been stored, and if consistent, determine that it is valid and if inconsistent, determine that it is invalid, or, wherein the cell to be accessed is selected by the terminal according to measurement results, or, the programs further comprise:

a network cloud chart updating module, configured to update the cell related information of the cell in the network cloud chart stored by itself according to a terminal common air interface configuration result after performing the terminal common air interface configuration and update the information update time stored by itself according to the information update time in the received cell broadcast message.

15. The terminal according to claim 13, wherein, the programs further comprise:

a cell selecting module, configured to select a new cell to be accessed after determining that it is needed to hand over to a new cell according to measurement results;

an uplink pilot frequency sending module, configured to send an uplink pilot frequency; and an access request sending module, configured to send an access request after receiving an uplink pilot frequency response sent by a network side, wherein an initiating access reason carried in the access request is an initial access initiated after failure of wireless links.

16. A terminal access system, comprising the terminal according to claim 13, an Internet server, a cell and a core network, wherein, the cell includes a parameter configuration module and a terminal information determination module, and the core network includes a parameter configuration module and a shared cloud chart storing module, and wherein:

the Internet server, is configured to store a network cloud chart containing cell related information, wherein the cell related information includes a terminal common air interface configuration parameter of the cell, and the terminal common air interface configuration parameter of the network cloud chart and/or a cell broadcast message includes a first uplink pilot frequency for intelligent access;

the parameter configuration modules of the cell and the core network, are configured to perform a wireless air interface parameter configuration procedure, wherein terminal common air interface configuration corresponding to the terminal common air interface configuration parameter in the network cloud chart is not performed if the terminal sends the first uplink pilot frequency, and the terminal common air interface configuration corresponding to the terminal common air interface configuration parameter in the network cloud chart is performed if the terminal sends the second uplink pilot frequency;

the shared cloud chart storing module of the core network, is configured to store a terminal information shared cloud chart containing related information of a terminal which is attached or has ever been attached to the network; and the terminal information determination module of the cell, is configured to determine whether the related information of the terminal is contained in the terminal information shared cloud chart stored by the core network;

wherein when the related information of the terminal is contained in the terminal information shared cloud chart, the parameter configuration modules of the terminal, the cell and the core network do not perform a security parameter configuration procedure, and when the related information of the terminal is contained in the terminal information shared cloud chart, the security parameter configuration procedure is performed.

17. The system according to claim 16, wherein the parameter configuration performed by the parameter configuration modules of the cell and the core network further includes inheriting an existing bearing configuration and transferring a data transmission relationship during handover of the cell; or, wherein the cell further comprises a shared cloud chart updating module, configured to send a terminal information update message to the core network when the information of the terminal is changed, the shared cloud chart storing module of the core network is further configured to update the terminal information shared cloud chart according to the terminal information update message, the shared cloud chart updating module of the cell is further configured to send a deactivation message to the shared cloud chart storing module of the core network when the cell disconnects the communication with the terminal, and the shared cloud chart storing module of the core network is further configured to start a timer according to the deactivation message, and delete the related information of a deactivated terminal if the timer expires and the terminal information update message has not been received.

18. The system according to claim 16, wherein the random access module of the terminal is set to interact with the cell by means of sending an uplink pilot frequency to the cell to be accessed and sending an access request after receiving the uplink pilot frequency, wherein if the terminal determines that it is needed to hand over to a new cell according to measurement results, the second uplink pilot frequency will be sent, the access reason carried in the access request is an initial access initiated after failure of wireless links, or, wherein the cell broadcast message further carries cell running state information, and if the cell running state information indicates the current cell is in a congestion state, then the random access module of the terminal reselects a cell to be accessed to perform the random access procedure.

19. The system according to claim 16, wherein the cell further comprises a terminal recognition module and a shared cloud chart updating module, and wherein:

the shared cloud chart storing module of the core network, is configured to store a terminal information shared cloud chart containing related information of a terminal which is attached or has ever been attached to the network, and update the terminal information shared cloud chart according to a terminal information update message;

the terminal recognition module of the cell, is configured to search for whether the terminal information shared cloud chart of the core network contains the related information of the terminal after receiving an access request sent by the terminal;

the parameter configuration modules of the core network, the cell and the terminal, are configured to perform a parameter configuration procedure, wherein security parameter configuration is not performed if the terminal information shared cloud chart contains the related information of the terminal, and the security parameter configuration is performed if the terminal information shared cloud chart does not contain the related information of the terminal; and the shared cloud chart updating module of the cell, is configured to send the terminal information update message to the core network when the information of the terminal is changed.

20. The system according to claim 19, wherein the shared cloud chart updating module of the cell is further configured to send a deactivation message to the terminal information shared chart of the core network when the cell disconnects communication with the terminal; and the shared cloud chart storing module of the core network is further configured to start a timer according the deactivation message, and delete the related information of a deactivated terminal if the timer expires and the terminal information update message has not been received.

* * * * *